(12) United States Patent
Hiraguchi

(10) Patent No.: US 7,237,740 B2
(45) Date of Patent: Jul. 3, 2007

(54) RECORDING TAPE CARTRIDGE

(75) Inventor: Kazuo Hiraguchi, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 11/495,710

(22) Filed: Jul. 31, 2006

(65) Prior Publication Data

US 2007/0023556 A1 Feb. 1, 2007

(30) Foreign Application Priority Data

Jul. 29, 2005 (JP) .............................. 2005-221441

(51) Int. Cl.
*G03B 23/02* (2006.01)
(52) U.S. Cl. .................................. 242/338.1; 360/132
(58) Field of Classification Search ................. 242/338, 242/338.1, 343, 343.2, 348, 348.2; 360/132
See application file for complete search history.

(56) References Cited

U.S. PATENT DOCUMENTS

| | | | | |
|---|---|---|---|---|
| 3,920,196 | A | * | 11/1975 | Tucker et al. ............. 242/338.1 |
| 4,014,042 | A | * | 3/1977 | Schoettle et al. ........... 242/338 |
| 4,033,523 | A | * | 7/1977 | Roman ..................... 242/338.1 |
| 4,210,296 | A | * | 7/1980 | Frechette ................. 242/338.1 |
| 6,452,747 | B1 | | 9/2002 | Johnson et al. |
| 7,040,564 | B1 | * | 5/2006 | Veno et al. ............... 242/338.1 |
| 7,104,486 | B2 | * | 9/2006 | Hiraguchi ................ 242/338.1 |
| 2005/0184179 | A1 | | 8/2005 | Hiraguchi |
| 2005/0184180 | A1 | | 8/2005 | Hiraguchi |
| 2005/0184181 | A1 | | 8/2005 | Hiraguchi |
| 2005/0184182 | A1 | | 8/2005 | Hiraguchi |
| 2005/0211813 | A1 | | 9/2005 | Hiraguchi |
| 2006/0231659 | A1 | | 10/2006 | Hiraguchi |

* cited by examiner

*Primary Examiner*—William A. Rivera
(74) *Attorney, Agent, or Firm*—Sughrue Mion, PLLC

(57) ABSTRACT

The present invention provides a recording tape cartridge including an engagement portion formed on a hub of a reel; a brake member provided movable along an axial-direction, regulating reel rotation by engaging with the engaging portion and releasing the engagement to allow reel rotation; a component mounting portion formed at a position further at inner-side of the hub; a lock member, mounted at the component mounting portion movable in a radial-direction and provided between the reel and the case to regulate movement of the reel in the axial-direction, which moves away from the reel by being pressed by the brake member to allow movement of the reel, the lock member having a center of gravity provided along a direction in which the brake member initially abuts with and presses the lock member; and a biasing member biasing the lock member in the radial-direction.

5 Claims, 18 Drawing Sheets

AFTER 15,000-TIMES ATTACHMENT/DETACHMENT (PRESENT INVENTION)
AFTER 15,000-TIMES ATTACHMENT/DETACHMENT

VIRGIN PRODUCT (BEFORE TEST)

RECORDING TAPE CARTRIDGE

CROSS-REFERENCE TO RELATED APPLICATION

This application claims priority under 35 USC 119 from Japanese Patent Application No. 2005-221441, the disclosure of which is incorporated by reference herein.

BACKGROUND OF THE INVENTION

1. Field of the Invention

The present invention relates to a recording tape cartridge. More particularly, the present invention pertains to a recording tape cartridge in which a single reel, with a recording tape such as a magnetic tape usable as a recording and reproducing medium for a computer or the like being wound thereon, is accommodated in a case.

2. Description of the Related Art

There has heretofore been known a recording tape cartridge in which a recording tape such as a magnetic tape usable as a recording and reproducing medium for a computer or the like is wound on a reel, and the reel is rotatably accommodated in a case formed from a synthetic resin. The recording tape cartridge is arranged such that when in use (when loaded into a drive device), the reel is rotatable in the case, while when in non-use (when not loaded into a drive device), the reel is locked so as to be non-rotatable in the case.

More specifically, the recording tape cartridge includes a brake section for preventing the reel from being rotated within the case when the cartridge is in non-use. The brake section may be constructed such that a brake member, which for example is non-rotatable with respect to the case, can be engaged with the reel.

As shown in FIG. 18, for example, a brake member 200 is configured in the form of a disk which is disposed in such a manner as to be vertically movable within a bottomed, generally cylindrical shape reel hub 204 of a reel 202. A pair of engagement projections 206 which define an approximate U shape as seen in a plan view are provided upright on the upper surface of the brake member 200. A pair of rotation regulating ribs 210 depending from the inner surface of an upper case section 208 are inserted inside the engagement projections 206, thereby making the brake member 200 non-rotatable with respect to the case 212.

Further, the brake member 200 is normally biased toward a bottom wall 216 of the reel hub 204 with the aid of a biasing member such as compression coil spring 214, so that an annular brake gear 218 formed in the lower surface of the brake member 200 is meshed with an annular engagement gear 220 formed in the upper surface of the bottom wall 216 of the reel hub 204. In this manner, the reel 202 is prevented from inadvertent rotation.

Still further, a generally cylindrical operation projection 222, which is projectingly provided at an axial center portion of the lower surface of the brake member 200, is inserted in a through hole 216A formed in an axial center portion of the bottom wall 216 of the reel hub 204, and exposed through a gear opening 226 formed substantially at a center portion of a lower case half 224. In an attempt to make the reel 202 rotatable, the operation projection 222 (brake member 200) is pushed upward, and as a result the brake gear 218 is disposed out of engagement with the engagement gear 220 (refer to U.S. Pat. No. 6,452,747, for example).

However, with the above-described arrangement, when the recording tape cartridge is in a non-use state, the reel 202 is movable upward (movable axially of the reel 202) against a biasing force of the biasing member such as compression coil spring 214. It is likely that in case the bottom wall 216 of the reel hub 204 is moved upward because of the recording tape cartridge being impacted due to dropping or the like, the brake member 200 becomes tilted and jammed at the edge of the through hole 216A while being in a tilted orientation (being on the point of falling) as shown in the drawing.

If the recording tape cartridge is loaded into a drive device under such a condition, there tends to arise a problem that not only the recording/reproducing operation cannot be performed but also the recording tape cartridge is damaged or the drive device malfunctions. Another problem is that an adverse affect arises since the reel becomes rotatable when in non-use, the recording tape tends to get wrinkled or torn off.

SUMMARY OF THE INVENTION

In view of the above-described circumstances, an object of the present invention is to provide a recording tape cartridge that regulates movement of a brake member in a state in which a reel is not rotatable, and that regulates movement of the reel.

The first aspect of the present invention is a recording tape cartridge that comprises: an engagement portion which is formed on a bottom wall of a hub of a reel which is rotatably accommodated in a case and on which a recording tape is wound; a brake member facing the engagement portion and provided so as to be movable along an axial direction of the hub, the brake member engaging with the engagement portion to regulate rotation of the reel and releasing the state of engagement with the engagement portion to allow rotation of the reel; a component mounting portion which is formed at the central portion of the case and positioned further at the inner side of the hub in a radial direction of the reel; a lock member, mounted at the component mounting portion so as to be movable in the radial direction of the reel and provided between the reel and the case to regulate at least movement of the reel in the axial direction, which moves away from the reel by being pressed by the brake member to thereby allow movement of the reel, the lock member having a center of gravity thereof provided along a direction in which the brake member initially comes into contact with and presses the lock member; and a biasing member which biases the lock member in the radial direction of the reel.

In the first aspect of the present invention, the lock member that is capable of moving in the radial direction of the reel is mounted at the component mounting portion. The lock member is interposed between the reel and the case, so as to regulate at least movement of the reel in the axial direction, and the lock member is pressed by the brake member and moves away from the reel, thereby allowing movement of the reel.

In other words, when the recording tape cartridge is in a nonuse state, the brake member and the engagement portion are in a state of engaging with each other. In the above-described state, by providing the lock member that regulates at least movement of the reel in the axial direction, the reel can be prevented from moving when the recording tape cartridge is in a nonuse state.

The lock member has a center of gravity provided along the direction in which the brake member initially comes into contact with and presses the lock member.

The lock member is moved horizontally in the radial direction of the reel by causing the brake member to come into contact with the lock member and also causing the brake member to move up or down along the axial direction of the hub. In a case in which the brake member does not come into contact with the center of gravity of the lock member, an angular moment (a torque) acts on the lock member and the lock member is thereby tilted. As a result, the sliding surface of the lock member is brought into a one-sided contact state in which the lock member does not slide with the whole sliding surface thereof.

When the use and nonuse of the recording tape cartridge is repeated, the lock member carries out reciprocating motion in the state of coming into contact with the inner surface of the case. Therefore, when the sliding portion of the lock member is worn out due to the lock member being brought into a one-sided contact state, powdery matters (shaving matters) are produced from the sliding portion of the lock member. As a result, a so-called adhesion phenomenon arises due to the generated powdery matters, so that the sliding resistance increases. For this reason, the force required for releasing the reel from the nonuse state (that is, the brake releasing force) becomes larger.

To this end, by providing the center of gravity in the lock member along the direction in which the brake member initially comes into contact with and presses against the lock member, the angular moment is not caused to act on the lock member when the brake member initially comes into contact with the lock member (at the time when the brake member begins to come into contact with the lock member).

Particularly, the static friction force is larger than the dynamic friction force, and therefore, at the time when the brake member begins to come into contact with the lock member, the pressing force of the brake member imparted to the lock member becomes the maximum. Accordingly, by preventing the sliding surface of the lock member from being brought into a one-sided contact state at the time when the brake member begins to come into contact with the lock member, it is possible to prevent the sliding portion of the lock member from being worn out and thereby prevent the brake releasing force from becoming large.

The second aspect of the present invention is characterized in that in the recording tape cartridge of the first aspect, the lock member comprises an inclined surface with which the brake member comes into contact, the inclined surface being inclined in the range of about 45 to 60 degrees with respect to a direction orthogonal to the axial direction of the reel.

It is also considered that in order to prevent the brake releasing force from increasing, the sliding resistance of the lock member is reduced. To this end, the vertical force imparted to the lock member is made smaller. In order to convert the vertical-direction force imparted by the brake member into the force acting in the horizontal direction, the abutted surface of the lock member which contacts the brake member is formed as an inclined surface, and it is desired that an angle of the inclined surface with respect to the vertical line becomes 90 degrees as far as possible.

However, the stroke of the brake member and the amount by the lock member moves are both restricted, and therefore, the tilt angle of the inclined surface is determined in accordance with the restrictions of the stroke of the brake member and the amount by the lock member moves. Therefore, in the second aspect of the invention, the inclined surface of the lock member with which the brake member comes into contact is set in the range of about 45 to 60 degrees. This makes it possible to reduce the sliding resistance of the lock member and whereby prevent the brake releasing force from becoming larger.

According to the third aspect of the present invention, in the recording tape cartridge as defined in the first aspect, the center of gravity of the lock member is provided on a line extending, from a point at which the brake member initially comes into contact with the lock member, in a direction in which the brake member presses the lock member.

The fourth aspect of the present invention is a recording tape cartridge that comprises: an engagement portion which is formed on a bottom wall of a hub of a reel which is rotatably accommodated in a case and on which a recording tape is wound; a brake member facing the engagement portion and provided so as to be movable along an axial direction of the hub, the brake member engaging with the engagement portion to regulate rotation of the reel and releasing the state of engagement with the engagement portion to allow rotation of the reel; a component mounting portion which is formed at the central portion of the case and positioned further at the inner side of the hub in a radial direction of the reel; a lock member, mounted at the component mounting portion so as to be movable in the radial direction of the reel and provided between the reel and the case to regulate at least movement of the reel in the axial direction, which moves away from the reel by being pressed by the brake member to thereby allow movement of the reel, the lock member having an inclined surface with which the brake member comes into contact, the inclined surface being inclined in the range of about 45 to 60 degrees with respect to a direction orthogonal to the axial direction of the reel, and an inclined angle, with respect to the direction orthogonal to the axial direction of the reel, of an inclined surface of the brake member with which the inclined surface of the lock member comes into contact being larger than the inclined angle of the inclined surface of the lock member; and a biasing member which biases the lock member in the radial direction of the reel.

According to the fifth aspect of the present invention, in the recording tape cartridge as defined in the fourth aspect, the lock member includes a center of gravity thereof provided along a direction in which the brake member initially comes into contact with and presses the lock member.

The present invention has the above-described structure, and therefore, when the recording tape cartridge is in a nonuse state, the brake member and the engagement portion are set in a state of engaging with each other. In this state, by providing the lock member which regulates at least the axial movement of the reel, the reel can be adapted so as not to move when the recording tape cartridge is in a nonuse state.

Further, by providing the center of gravity in the lock member along the direction in which the brake member initially comes into contact with and presses against the lock member, the angular moment is not caused to act on the lock member at the time when the brake member begins to come into contact with the lock member. Particularly, the static friction force is larger than the dynamic friction force, and therefore, at the time when the brake member begins to come into contact with the lock member, the pressing force of the brake member imparted to the lock member becomes the maximum. For this reason, by preventing the sliding surface of the lock member from being brought into a one-sided contact state at the time when the brake member begins to come into contact with the lock member, it is possible to prevent the sliding portion of the lock member from being worn out and resultingly prevent the brake releasing force from becoming larger.

Further, by the inclined surface of the lock member with which the brake member comes into contact being set in the range of about 45 to 60 degrees, the sliding resistance of the lock member is reduced, thereby making it possible to prevent the brake releasing force from becoming larger.

BRIEF DESCRIPTION OF THE DRAWINGS

Embodiments of the invention will be described in detail with reference to the following figures, wherein:

FIG. 14A shows comparative data with respect to those of the present invention, FIG. 14B shows data that indicates brake releasing force in the present invention, and FIG. 14C shows data that indicates brake releasing force of a virgin product;

DETAILED DESCRIPTION OF THE INVENTION

Figure 1A:
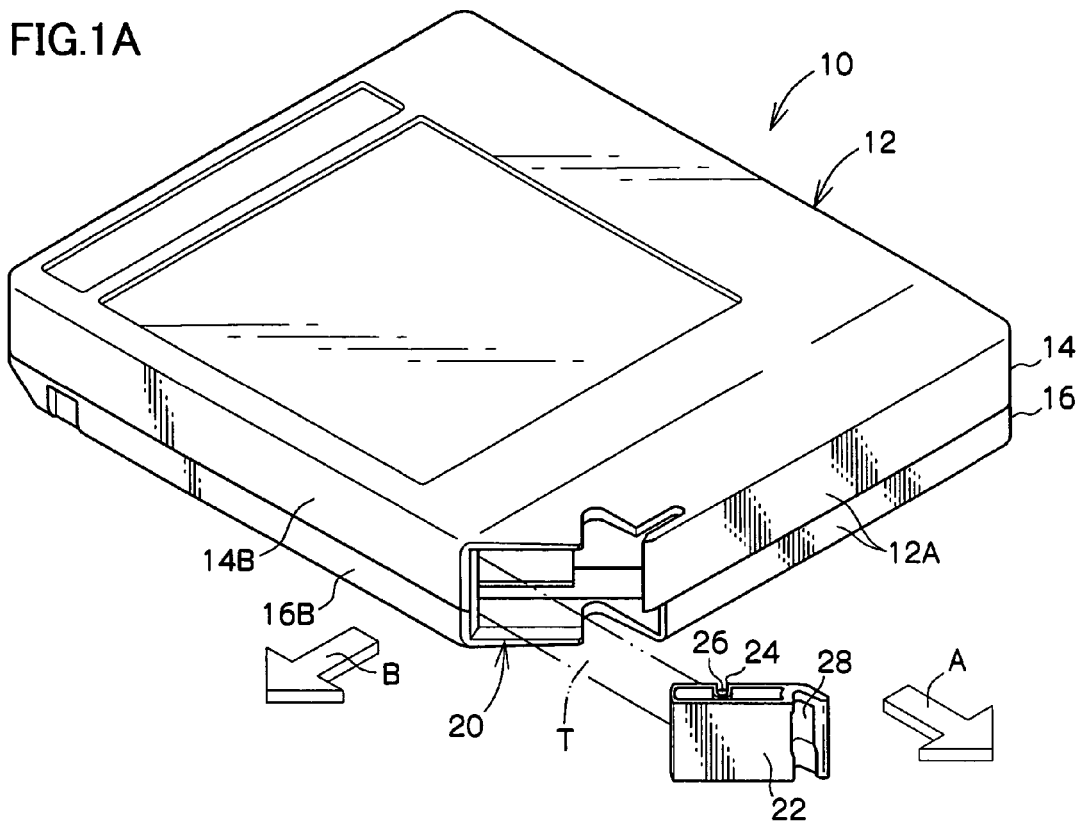
FIGS. 1A and 1B each show a schematic perspective view of a recording tape cartridge.
Figure 1B:
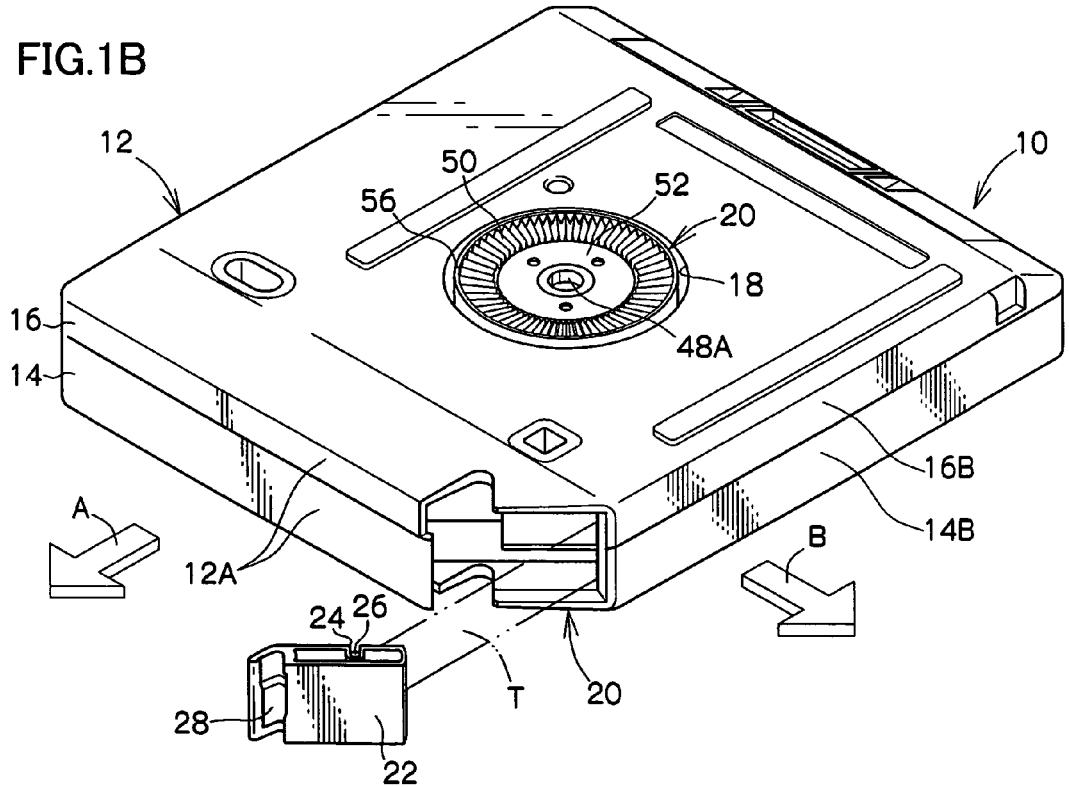

An embodiment of the present invention will be hereinafter described in detail based on examples shown in the attached drawings. A reel according to the present invention is applied to a recording tape cartridge 10. Accordingly, for convenience of explanation, the direction in which the recording tape cartridge 10 is loaded into a drive device is indicated, as the forward direction, by arrow A. A direction orthogonal to the direction of arrow A, which is indicated by arrow B, means the rightward direction.

First, the overall structure of the recording tape cartridge 10 will be described. As illustrated in FIGS. 1A, 1B, 2, 3 and 4, the recording tape cartridge 10 has a substantially rectangular box-shaped case 12. The case 12 is formed such a manner that an upper case section 14 and a lower case section 16, both of which sections are made from synthetic resins, are joined together by means of ultrasonic welding, screwing or the like with their respective peripheral walls 14B and 16B being butted on each other.

A single reel 40 is accommodated inside the case 12. A recording tape T such as a magnetic tape serving as an information recording/reproducing medium is wound on the reel 40. An opening 20 is formed in the case 12 at the right front corner portion. The opening 20 is formed so as to pull out the recording tape T wound on the reel 40.

A leader block 22 is mounted at a leading end portion of the recording tape T. In other words, an elastic pin 26 is fitted in a concave portion 24 of the leader block 22 in a state in which the leading end of the recording tape T is caught in the concave portion 24. When the recording tape cartridge 10 is in a nonuse state, the leader block 22 is caught in the peripheral edge portion of the opening 20, so as to close the opening 20.

Further, when the recording tape cartridge 10 is in use, the leader block 22 is pulled out from the opening 20 due to a pull-out member (not shown) provided at the side of the drive device being engaged with an engagement portion 28 formed at a distal end of the leader block 22. Incidentally, a member mounted at the leading end portion of the recording tape T is not limited to the leader block 22. Although not illustrated, a rotary-type member that closes the opening 20 may be provided, and a leader tape, a leader pin or the like (not shown) may also be used.

The reel 40 is formed from a resin material and is constituted by a reel hub 42 having a bottomed cylindrical shape, an upper flange 44 integrally provided on and extending from the upper end portion of the reel hub 42, and a lower flange 46 attached to the lower end portion of the reel hub 42 by means of welding or the like. Accordingly, the reel hub 42 and the lower flange 46 are formed from compatible resin materials and thus can be readily welded together by means of ultrasonic waves or the like.

The gap between the upper and lower flanges 44 and 46 is defined so as to be substantially equal to the width of the recording tape T, so that the width-wise position of the recording tape T wound on the reel hub 42 is controlled (regulated).

Figure 2:
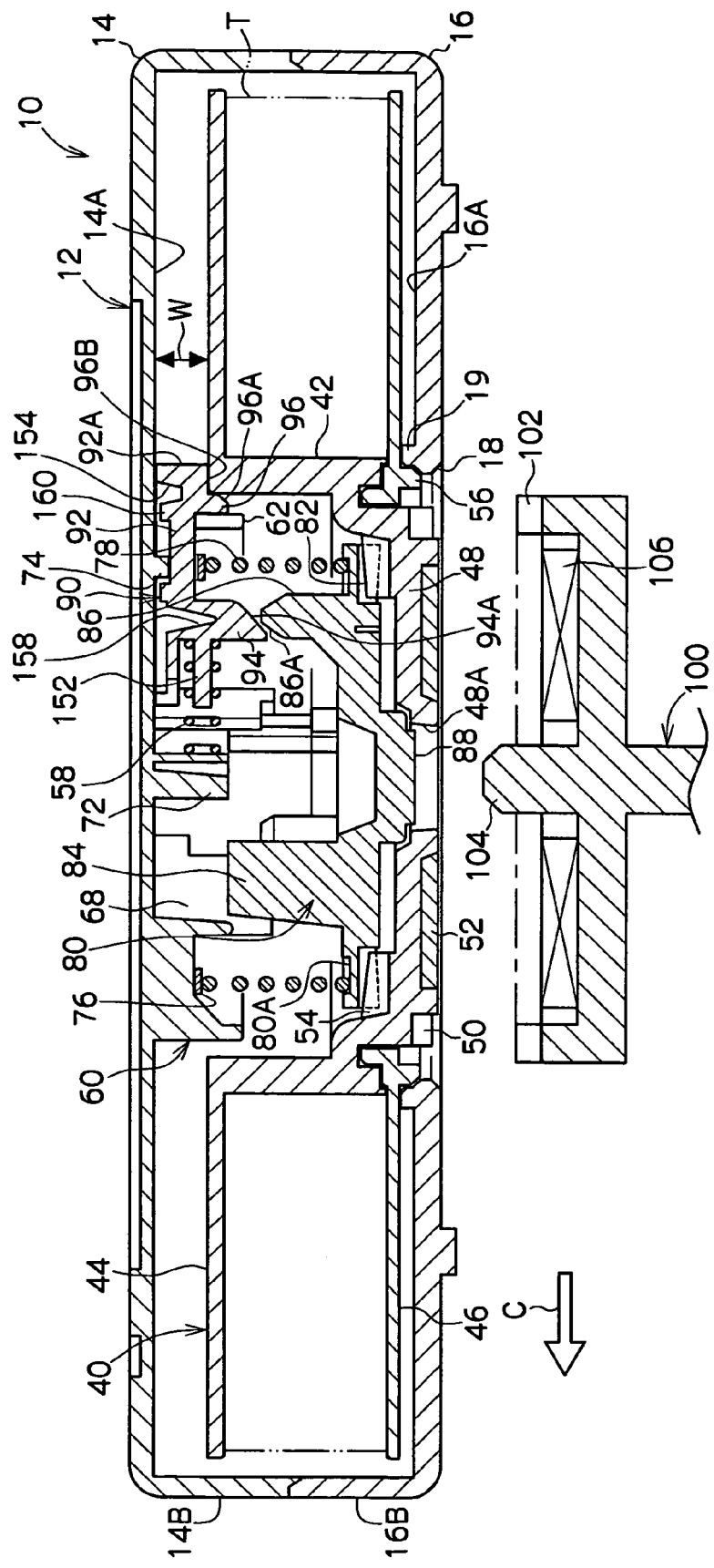
FIG. 2 is a schematic sectional side view of the recording tape cartridge in the state before a rotary shaft moves upward.
Figure 3:
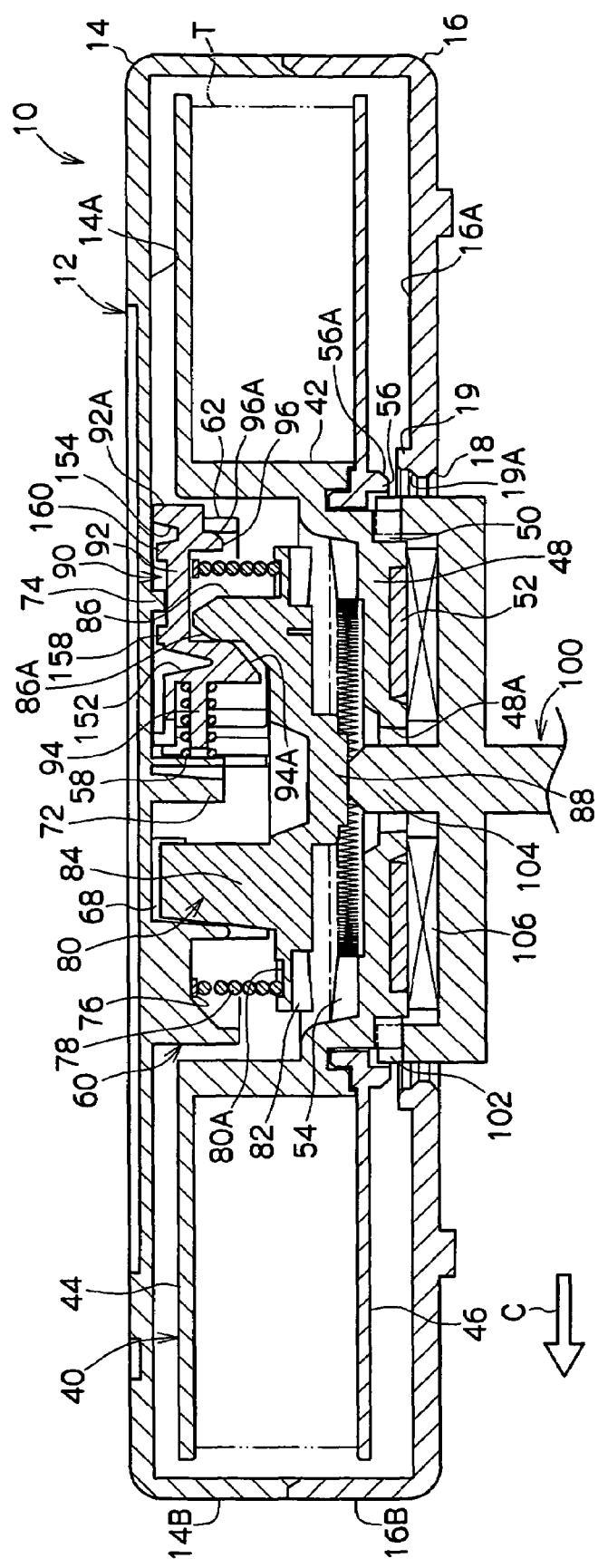
FIG. 3 is a schematic sectional side view of the recording tape cartridge in the state after the rotary shaft moves upward.

Further, as shown in FIGS. 2 and 3, the reel hub 42 is provided, on the lower flange 46 side, with a bottom wall 48 having a through hole 48A formed at an axial center portion thereof. A reel gear 50 is formed in an annular shape on the lower surface of the bottom wall 48. In response to the reel 40 being pressed against the lower case section 16 due to a biasing force of a compression coil spring 78, the reel gear 50 is exposed through a circular gear opening 18 formed at a generally axial center of the lower case section 16 so as to be meshed with a drive gear 102 provided on a rotary shaft 100 of the drive device, thereby transmitting a rotary force to the reel 40.

An annular rib 19 is provided upright at the peripheral edge of the gear opening 18 so as to extend upward (inside the case 12) and the inner peripheral surface of the annular rib 19 (which peripheral surface is at the side of the gear opening 18) is formed as a tapered surface 19A. An annular rib 56 extending downward is provided upright on the lower surface of the reel 40 (the lower flange 46) and at the outer side of the reel gear 50 in the radial direction thereof, and the outer peripheral surface of the annular rib 56 is formed as a tapered surface 56A. Accordingly, when the recording tape cartridge 10 is in a nonuse state, the tapered surface 56A of the annular rib 56 comes in surface-contact with the tapered surface 19A of the annular rib 19 (see FIG. 9), so as to allow the reel 40 to be positioned and supported by the lower case section 16 (the case 12).

An annular reel plate 52 formed from a magnetic material is integrally fixed to a portion radially inside of the reel gear 50 using an insert molding technique or the like. Under a condition that the drive gear 102 and reel gear 52 are meshed with each other, the reel plate 52 is drawn due to a magnetic force of an annular magnet 106 interposed between the drive gear 102 and a release projection 104 which will be described below. This prevents misalignment of axes (axis deviation) which occurs between the reel 40 and the rotary shaft 100 while at the same time making it possible to maintain the meshing relationship between the reel gear 50 and the drive gear 102. With such an arrangement, as the rotary shaft 100 rotates about its axis, the reel 40 rotates integrally with the rotary shaft 100 within the case 12.

Meanwhile, on the upper surface side of the bottom wall 48 of the reel hub 42, an engagement gear 54 is annularly formed which is adapted to be meshed with a brake gear 82 of a brake member 80. The brake member 80 is formed in a shape of a disk and accommodated within the reel hub 42 so as to be movable vertically (in an axial direction of the reel 40), with the brake gear 82 being provided annularly at an outer periphery of the lower surface thereof.

Further, on the upper surface of the brake member 80 are provided upright, with equal intervals and in an alternate form, plural (three in this embodiment) plate-like guide portions 84 which are adapted to be interposed between guide wall portions 68 (described later) of the upper case section 14 and plural (three in this embodiment) substantially rectangular column-shaped engagement projections 86 which are adapted to be engaged with cam portions 94 of plural (three in this embodiment) lock members 90 which will be described later.

A tapered surface 86A is formed at the inner side of each of the engagement projections 86 in such a manner as to be tilted at an angle of 30 to 60 degrees to the axis line of the reel hub 42. The tapered surface 86A can be made in contact with the tapered surface 94A formed in the cam portion 94 of the lock member 90 (described later).

Still further, on the upper surface of the brake member 80, outside the guide portions 84 and engagement projections 86, a flat surface 80A is provided in an annular form which is adapted to be made in contact with a lower end of a compression coil spring 78, which serves as a biasing member, when the recording tape cartridge 10 (the case 12) has been assembled.

Furthermore, at a center portion of the lower surface of the brake member 80 is projectingly provided a substantially columnar operation projection 88 which can be inserted through the through hole 48A and disposed in contact with a release projection 104 which is projectingly provided at an axial center portion of the rotary shaft 100 of the drive device (see FIGS. 2 and 3).

It should be noted that the operation projection 88 has a height such that the operation projection 88 does not extend downward out of the through hole 48A (the bottom wall 48) (a height such that the operation projection 88 is disposed within the through hole 48A), as shown in these drawings, thereby preventing the brake member 80 from being moved upward inadvertently.

Figure 4:
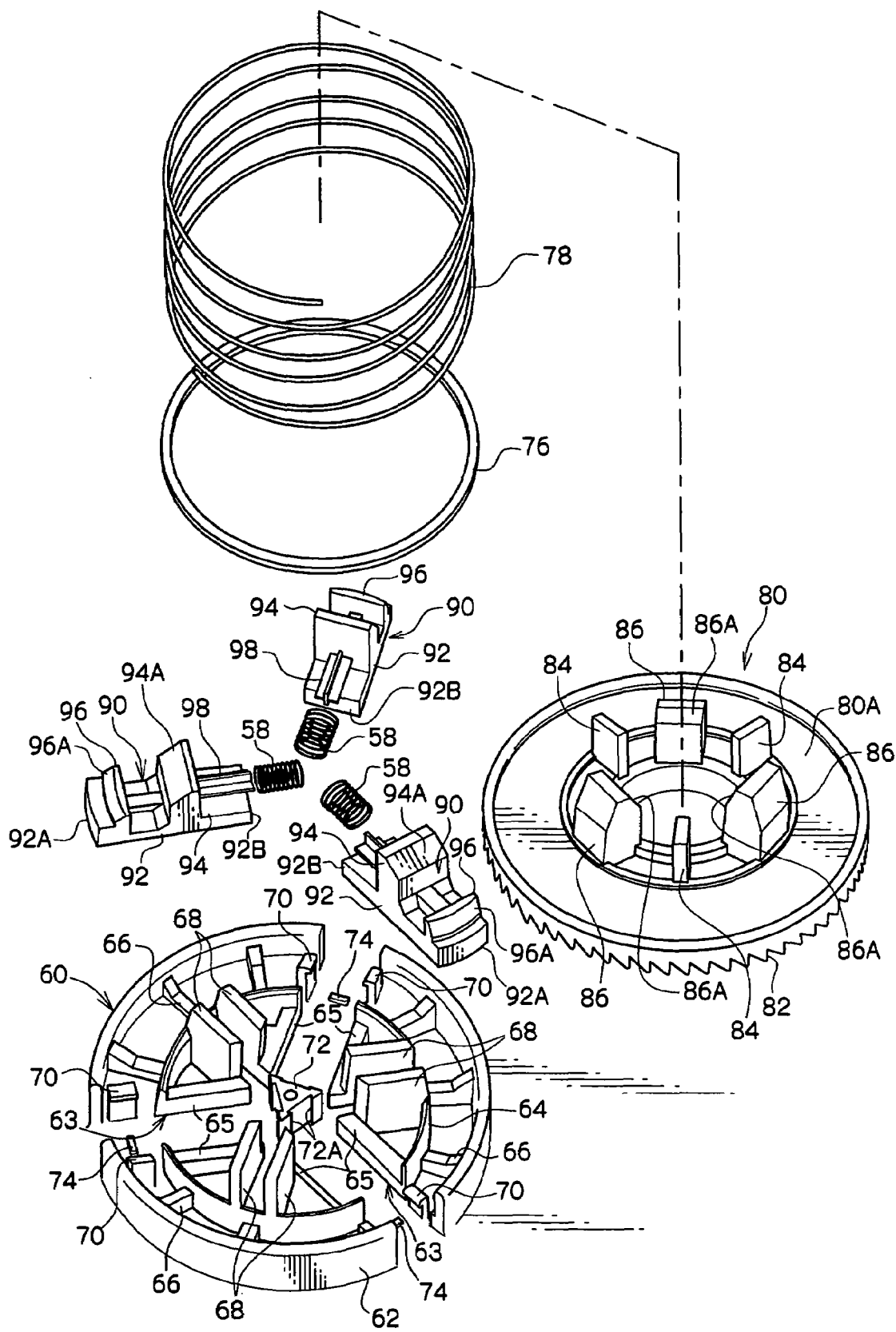
FIG. 4 is an exploded perspective view which schematically shows the structure of a mounting portion formed in an upper case section.
Figure 5:
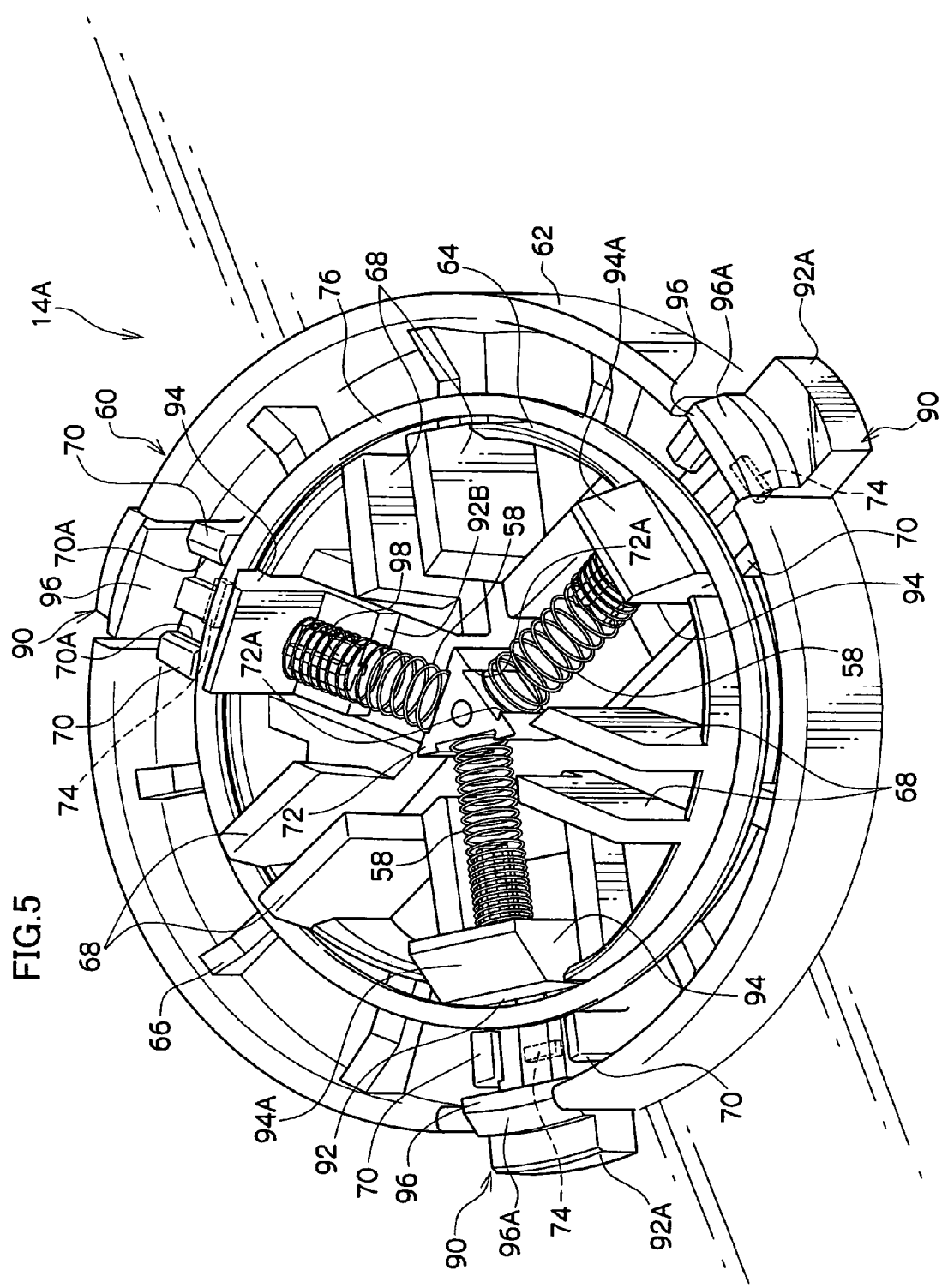
FIG. 5 is a perspective view which schematically shows the mounting portion formed in the upper case section.

As shown in FIGS. 4 and 5, a mounting portion 60 is formed substantially at an axial center portion of the inner surface of top plate 14A of the upper case section 14 (at an axial center portion of the reel hub 42). The mounting portion 60 slidably accommodates the plural (three) lock members 90 and so forth which are engaged with the upper edge portion of the reel hub 42 from the inner peripheral surface side thereof, thereby preventing the reel 40 from being moved axially (vertically).

The mounting portion 60 includes two types of cylindrical walls 62 and 64 which are provided upright in the form of concentric outer and inner circles respectively, as seen in a plan view, the outer one of which is made higher than the inner one. The cylindrical walls 62 and 64 are notched at predetermined positions (at three positions spaced apart from each other at uniform intervals). Guide ribs 65 are provided upright inside of the notched portions of the cylindrical walls 64 in such a manner as to extend in radial directions. The lock members 90 are accommodated in accommodation portions 63 defined between the guide ribs 65 in such a manner as to be radially slidable.

Plural (nine in this embodiment) plate-like support ribs 66 are provided upright between the cylindrical walls 62 and 64 in such a manner as to interconnect the cylindrical walls 62 and 64. Further, between the respective accommodation portions 63 and inside of the cylindrical walls 64 are provided in pairs guide wall portions 68 between which the guide portions 84 of the brake member 80 are inserted, wherein the number of pairs of the guide wall portions 68 is equal to that of the guide portions 84.

The pairs of the guide wall portions 68 are, as shown in FIGS. 4 and 5, provided projectingly so as to extend along radial directions, with outer end surfaces of the guide wall portions 68 being flush with each other on the outer peripheral surfaces of the cylindrical walls 64. The space between the guide wall portions 68 of each pair is made substantially equal to or slightly larger than the thickness of each guide portion 84.

Figure 6:
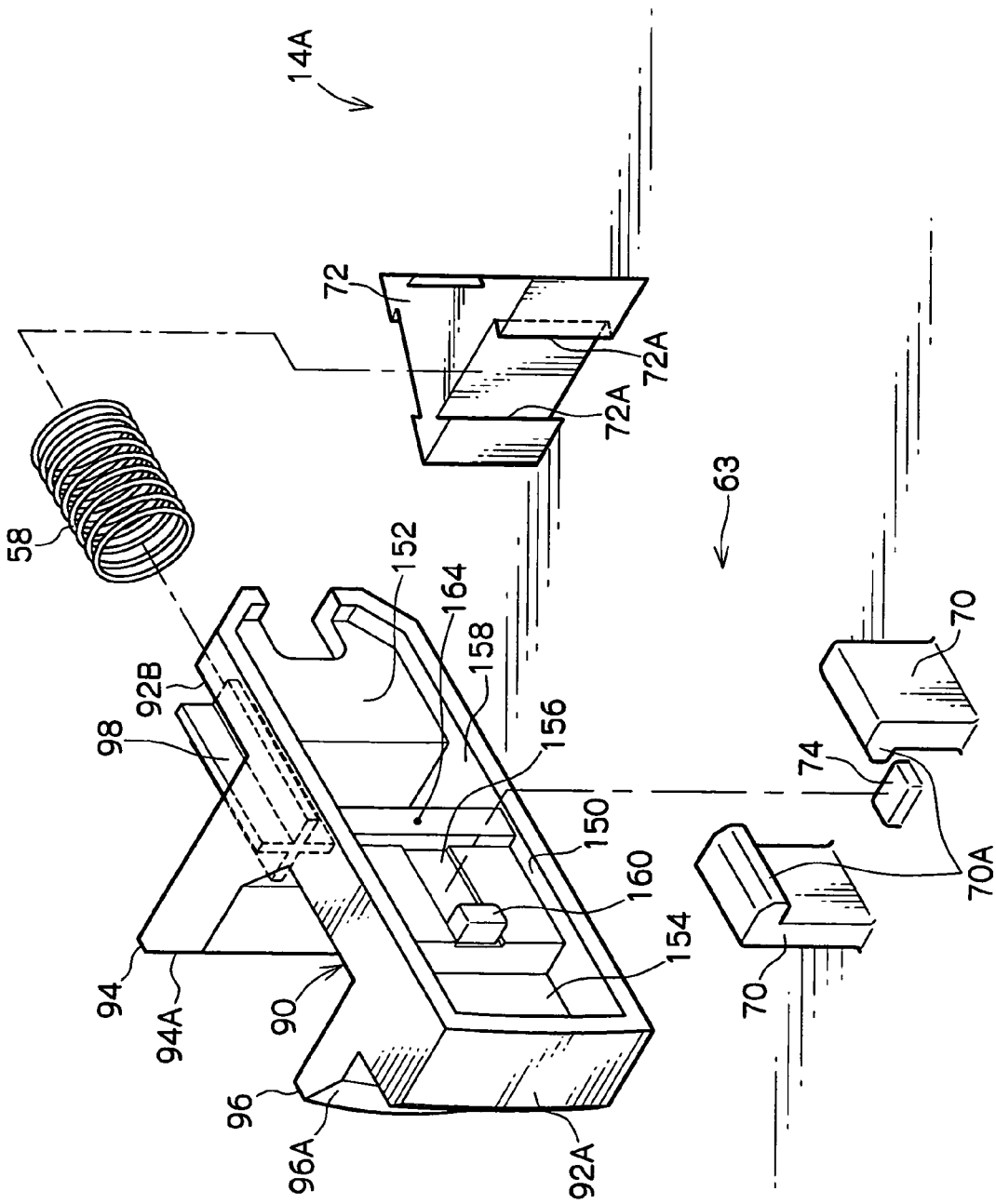
FIG. 6 is a perspective view which schematically shows a state in which a lock member and a coil spring are incorporated.
Figure 7:
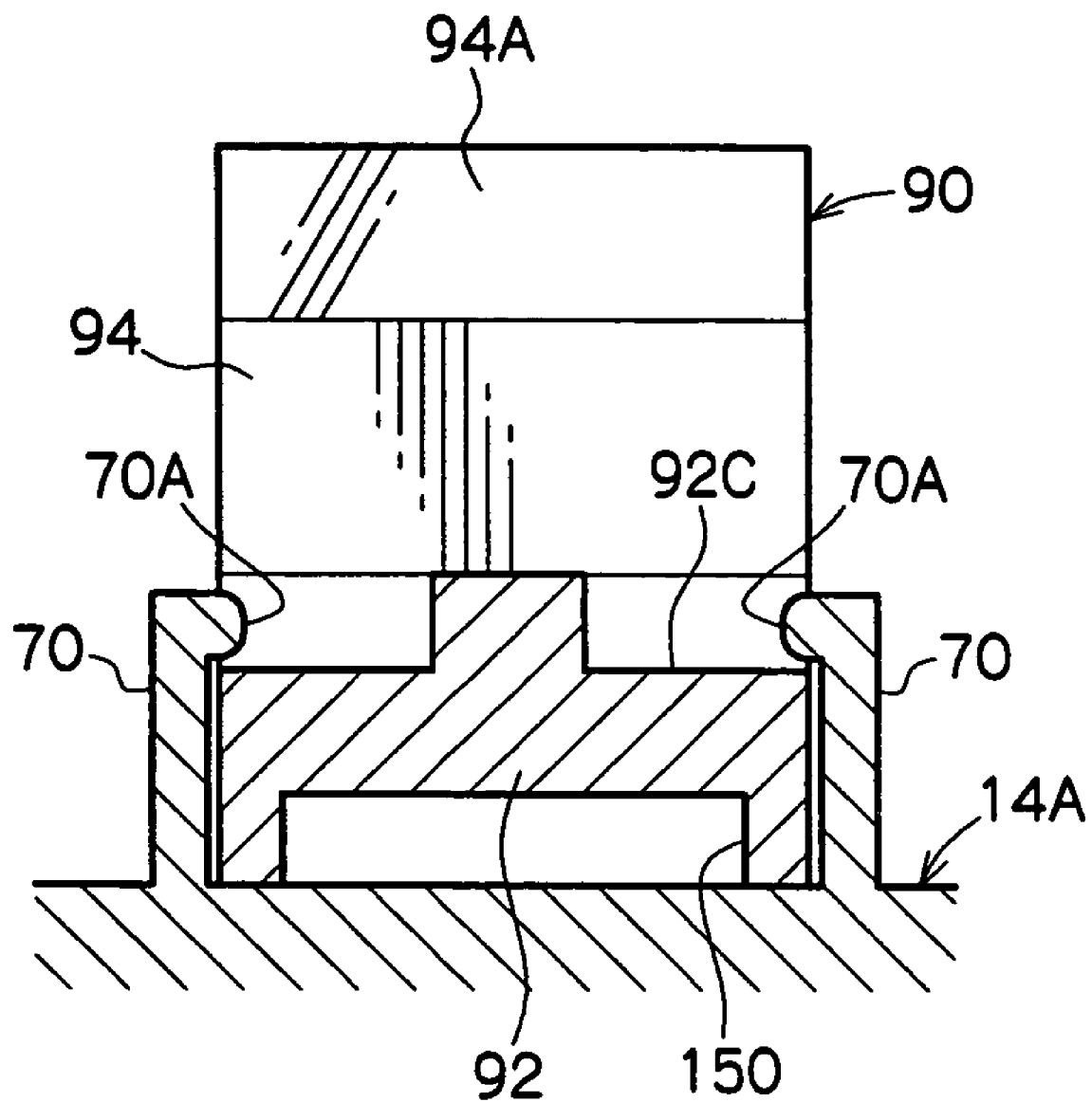
FIG. 7 is a schematic cross sectional view of a lock member held in a holding portion.

Further, pairs of holding portions 70 are projectingly provided between the cylindrical walls 62 and 64 at the opposite sides of the accommodation portions 63 (on the extension of the guide rib 65), each pair of the holding portions 70 being adapted to hold a respective one of the lock members 90 slidably (with a small gap). On the leading ends (lower end) of the holding portions 70 of each pair are provided undercut portions 70A which are formed as projections extending inward with respect to each other (toward the lock member 90), as shown in FIGS. 6 and 7.

These undercut portions 70A are adapted to temporarily hold each of the lock members 90 at least to the extent that the lock member 90 does not drop off (is not removed) from the mounting portion 60 (the accommodation portion 63) when the upper case section 14 is laid over (attached to) the lower case section 16 with the upper case section 14 being turned over such that the inner surface of the top plate 14A faces downward (when the case 12 is assembled) after the lock member 90 is incorporated.

More specifically, when molded in a mold, the undercut portions 70A are protruded inward to such an extent as to be capable of being drawn from the mold (about 0.1 mm to 0.5 mm, preferably about 0.3 mm). In addition, the undercut portions 70A are formed substantially in an arcuate shape as seen in a sectional side view, thereby facilitating the drawing thereof from the mold. Meanwhile, the holding portions 70 are formed to be about 4 mm in height, and about 0.35 mm to 1.2 mm, preferably about 0.5 mm to 0.8 mm in thickness.

Further, the holding portions 70 may be formed either integrally with the upper case 14 or separately from the upper case section 14 and fixed thereto. With an arrangement that the holding portions 70 are formed separately from the upper case section 14 and fixed thereto, it is possible that the lock members 90 may be incorporated after having been placed on the upper case section 14 so that the undercut portions 70A can be formed either in a further protruding shape or gate-like shape (lateral U-shape), thereby making it possible to remove the necessity for a stopper member 76 which will be described below.

A locking projection 72 that holds one end of the coil spring 58 is provided so as to protrude from substantially the center of the inner surface of the top plate 14A (on the shaft center line of the reel hub 42 and at the center of the mounting portion 60). The coil spring 58 is provided for each of the lock members 90 (in this case, three coil springs 58 are provided). These lock members 90 are each normally biased from the center of the mounting portion 60 (the center of the reel 40) outward in the radial direction.

The locking projection 72 is formed substantially in the form of a triangular prism, so as to be capable of holding the three coil springs 58 at a time. A pair of locking pawls 72A is formed respectively at both end portions of each of side surfaces of the locking projection 72 across its entire length in the height-wise direction in such a manner as to protrude inward. The pair of locking pawls 72A is capable of holding and catching one roll of the corresponding coil spring 58 from both ends.

Further, in the accommodation portions 63 of the mounting portion 60, stopper ribs 74 (described later) are each provided protrudingly between adjacent holding portions 70, and when the lock member 90 and the coil spring 58 are incorporated, the stopper rib 74 temporarily locks the lock member 90 biased by the coil spring 58 (until the upper case section 14 is laid over the lower case section 16).

Accordingly, the lock member 90 is held in a state of being subjected to a certain degree of tension by the coil spring 58 and the stopper rib 74, and therefore, the lock member 90 is further prevented from dropping off. This results in improvement in the built-in property of the lock members 90.

Figure 8:
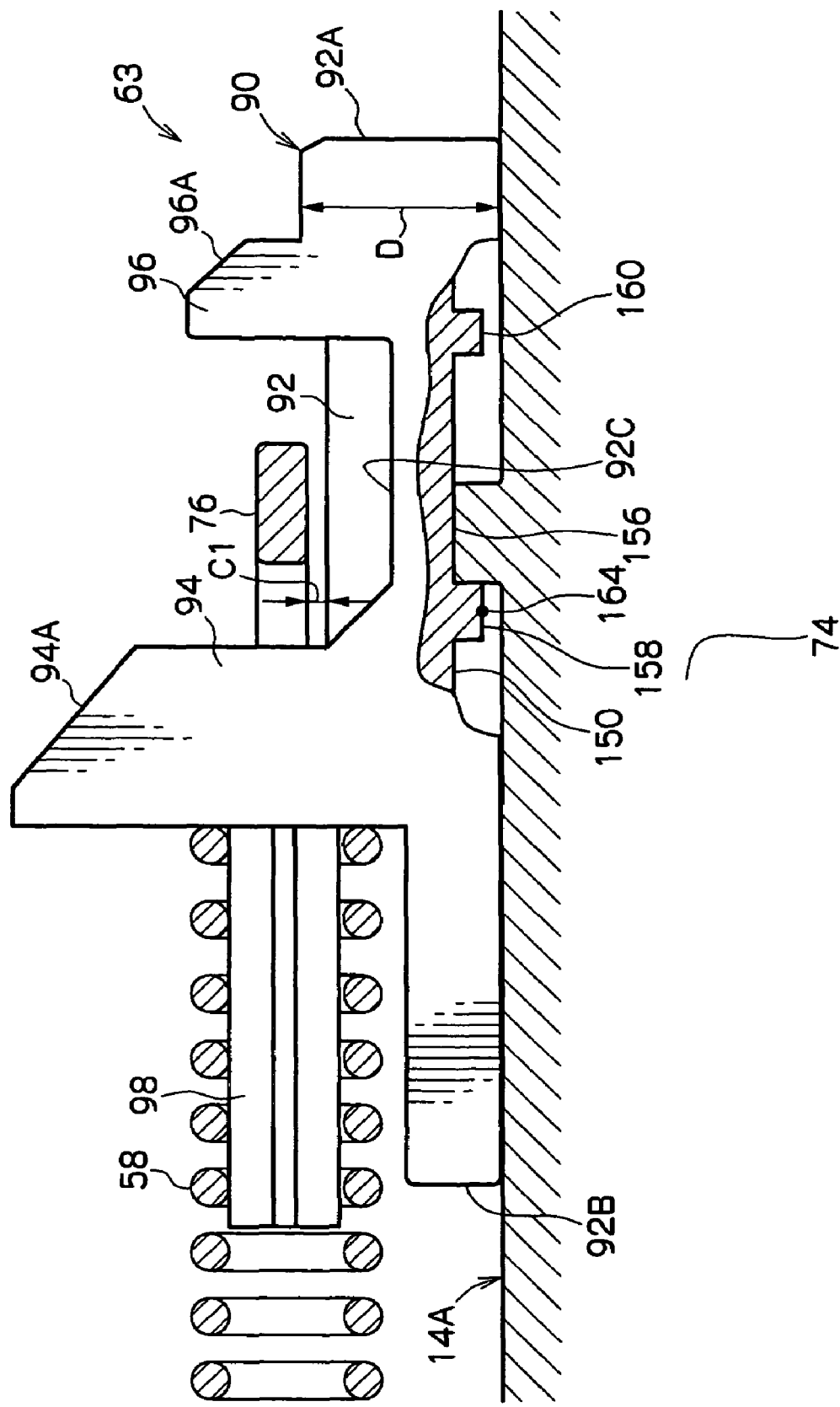
FIG. 8 is a schematic side view of the lock member held in the holding portion.

After the lock members 90 are temporarily supported by the holding portions 70, a ring-shaped stopper member 76 formed from resin materials is welded on the supporting ribs 66 by means of ultrasonic waves or the like. The stopper member 76 is adapted to serve as a drop-out preventing member for permanently keeping the lock members 90 from sliding and dropping off. A predetermined clearance C1 (C1 equals to about 0.05 mm to 0.4 mm) is secured between the stopper member 76 and the lock members 90 as shown in FIG. 8 in order not to hinder the lock members 90 when the lock members 90 are caused to slide, as shown in FIG. 8. The heights of the supporting ribs 66 are so defined as to secure the clearance C1.

Further, when the recording tape cartridge 10 is assembled (when the upper case section 14 is placed over the lower case section 16), the upper end of the compression coil spring 78 is brought into contact with the stopper member 76, so that the compression coil spring 78 is held between the stopper member 76 (the upper case section 14) and the flat surfaces 80A (the brake member 80). The upper end of the compression coil spring 78 may be disposed in contact with the supporting ribs 66 instead of with the stopper member 76.

However, if the upper end of the compression coil spring 78 is disposed in contact with the stopper member 70, the stopper member 76 does not need to be welded on the supporting ribs 66. The stopper member 76 is not limited to a ring-shaped configuration shown in the drawings, and it is only required that the stopper member 76 be at least bridged between the supporting ribs 66 on the opposite sides of the lock members 90 so as to prevent the lock members 90 from dropping down all the time. An arrangement may be made such that simply the stopper member 76 is provided while the holding portions 70 are omitted. An arrangement may also be made such that simply the holding portions 70 are provided while the stopper member 76 is omitted.

The lock members 90 are held in the accommodation portions 63 so as to be slidable in the radial directions thereof in the state of being prevented from dropping off by the holding portions 70, the stopper member 76 and the like. The lock members 90 each have a main body portion 92 formed substantially in the shape of a rectangular column, which main body portion 92 comes in sliding-contact with the inner surface of the top plate 14A of the upper case 14. A substantially rectangular column-shaped cam portion 94 having the same width-wise dimension as that of the main body portion 92 is provided so as to protrude in a direction perpendicular to the main body portion 92 (in the axial direction of the reel 40) in the vicinity of an end portion 92B at the inner side of the main body portion 92 in the radial direction.

Figure 9:
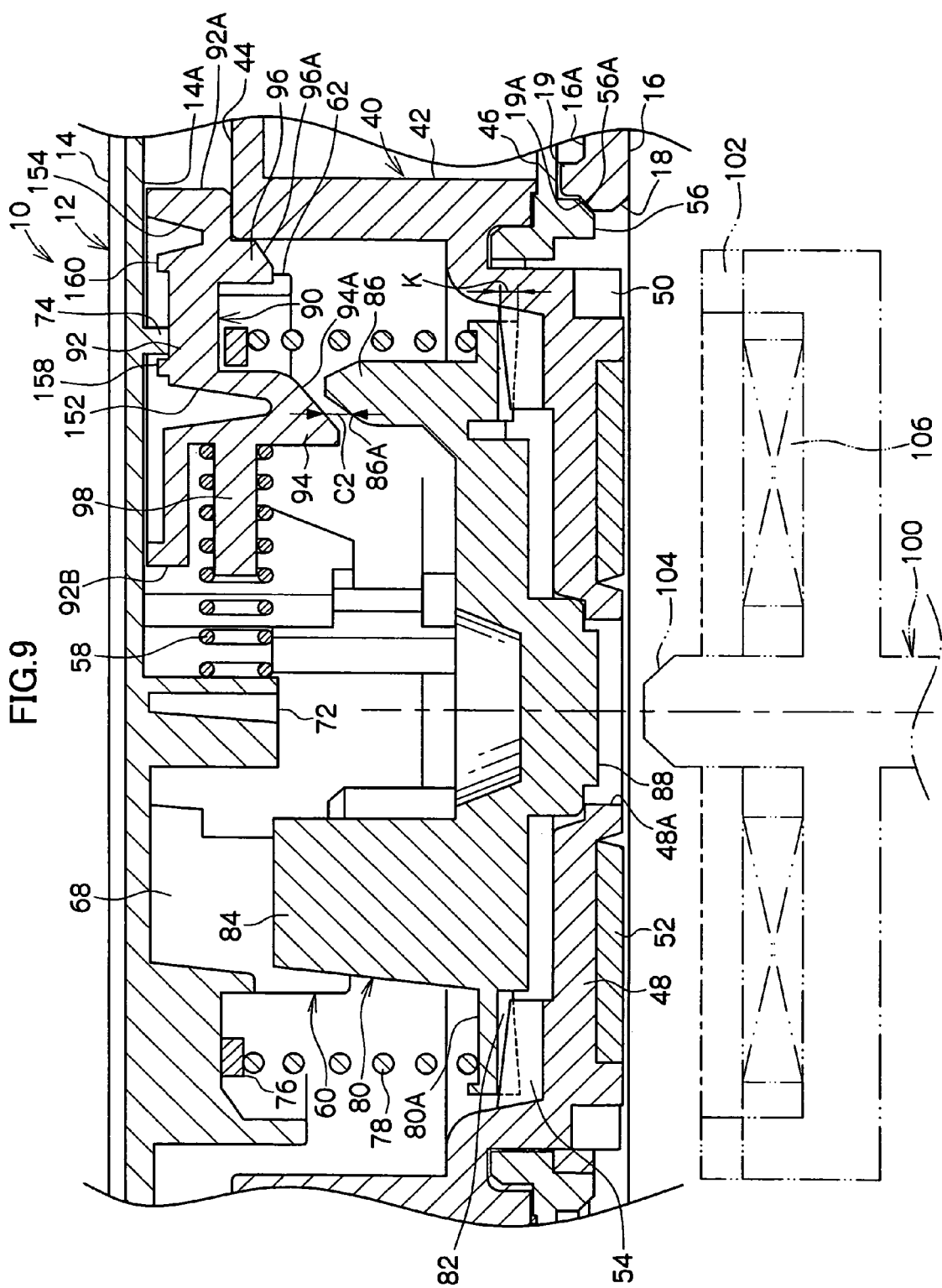
FIG. 9 is a partially enlarged, sectional side view which schematically shows the recording tape cartridge in the state before the rotary shaft moves upward.

Further, as shown in FIGS. 6, 8 and 9, a concave portion 150 is formed on the rear surface of the lock member 90, and an outer edge of the rear surface of the lock member 90 serves as a sliding surface on the inner surface of the top plate 14A.

So-called hollow portions 152 and 154 are formed at both end sides of the concave portion 150, respectively, at portions corresponding to the cam portion 94 and an engagement portion 96 (described later).

A groove portion 156 is formed between the hollow portions 152 and 154 along the intermediate portion in the width-wise direction of the lock member 90, and the stopper rib 74 can be engaged with the groove portion 156. As a result, the lock member 90 is moved to slide within the accommodation portion 63 via the groove portion 156 in the state of being guided by the stopper rib 74.

Abutment portions 158 and 160 are provided so as to protrude respectively from both ends of the groove portion 156 of the lock member 90, and the movement of the lock member 90 is regulated when being in contact with the stopper rib 74. The abutment portions 158 and 160 are each provided so as to become lower than the inner surface of the top plate 14A, and when the lock member 90 is caused to slide, the upper surfaces of the abutment portions 158 and 160 are adapted not to slide on the inner surface of the top plate 14A.

On the inner slide surface of the cam portion 94 in the radial direction, a fit-in portion 98 having a cross-shaped configuration in section is provided protrudingly inward in the radial direction by a predetermined length, and the other end of the coil spring 58 is inserted and fitted in the fit-in portion 98. The outer diameter of the fit-in portion 98 is made slightly larger than the inner diameter of the coil spring 58, so that the coil spring 58 is adapted not to be separated from the fit-in portion 98. Further, the main body portion 92 includes an end portion 92B provided further at the inner side in the radial direction than the cam portion 94 and extending inward in the radial direction by a predetermined length (so that the end portion 92B becomes slightly longer than the fit-in portion 98).

Accordingly, the center of gravity G (see FIG. 10) of the lock member 90 can be positioned at a lower position thereof. In a case in which the lock member 90 and the coil spring 58 are incorporated in the mounting portion 60 (the accommodation portion 63) and held between the locking projection 72 and the stopper rib 74, the lock member 90 can be further prevented from jumping out from the mounting portion 60 (the accommodation portion 63) due to tension of the coil spring 58. That is to say, the above-described structure allows further improvement in the built-in properties of the lock member 90 and the coil spring 58.

Figure 10:
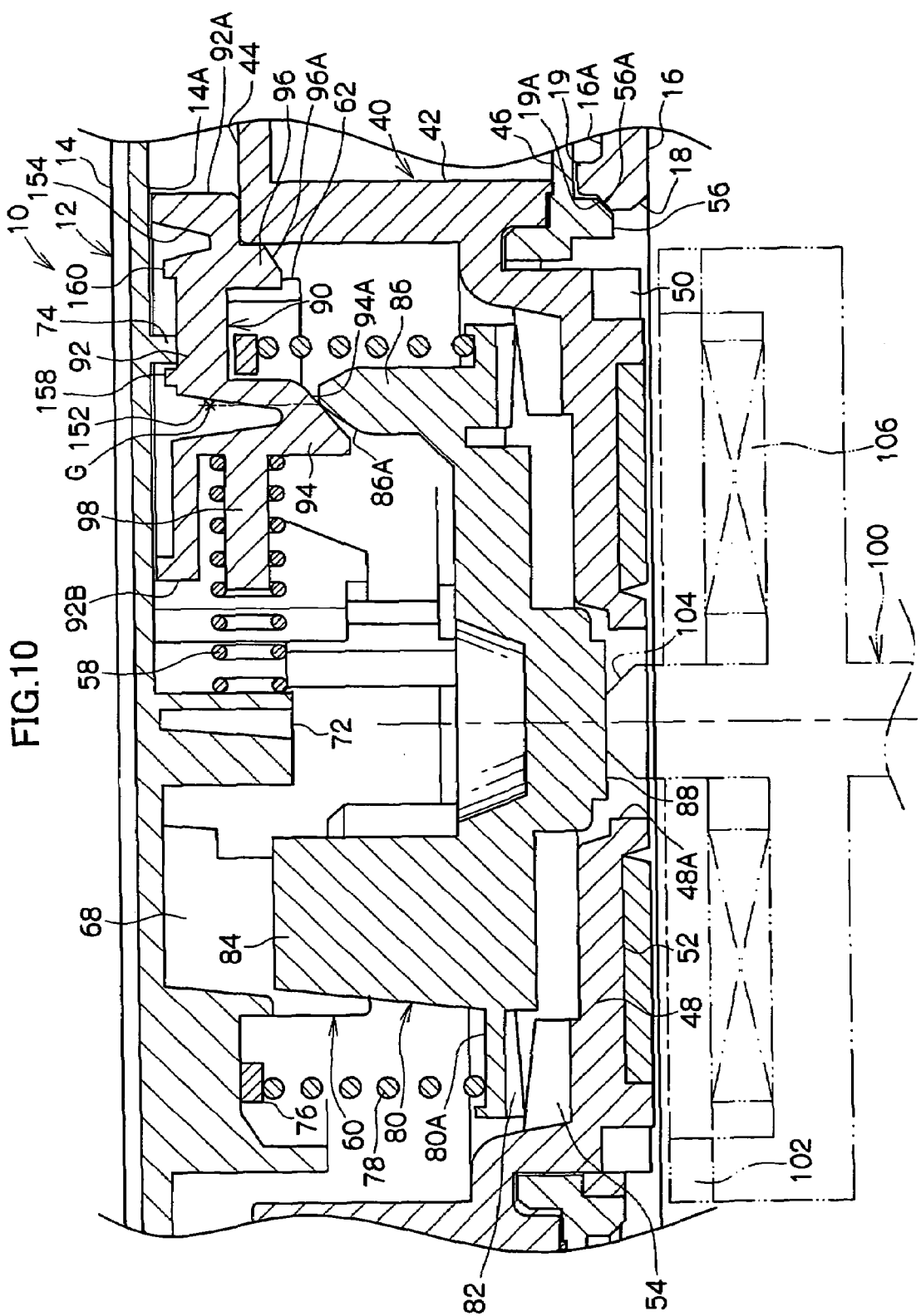
FIG. 10 is a partially enlarged, sectional side view which schematically shows the recording tape cartridge at the time when the rotary shaft starts to move upward.

Further, a tapered surface 94A is formed at the outer side in the radial direction of the lower end surface of the cam portion 94 and is inclined at about 56 degrees with respect to the horizontal direction (that is, a direction orthogonal to the axis line of the reel hub 42). As shown in FIG. 10, the gradient (slope) of the tapered surface 86A of the brake member 80 is made more sharply than that of the tapered surface 94A (the inclined angle of the tapered surface 86A is larger than that of the tapered surface 94A), so that the tapered surface 86A is brought into line-contact with the tapered surface 94A.

In the state in which the tapered surface 86A of the brake member 80 is brought into contact with the tapered surface 94A of the lock member 90, pressing force from the brake member 80 acts on the lock member 90. The lock member 90 is formed so that the center of gravity of the lock member 90 is provided along the direction in which the pressing force acts (the center of gravity of the lock member 90 is provided on a line extending, from a point at which the brake member 80 initially comes into contact with the lock member 90, in a direction to which the brake member 80 presses the lock member 90).

The above-described pressing force is decomposed into a force acting in the horizontal direction against the tapered surface 94A and a force acting in the vertical direction against the tapered surface 94A (these forces are so-called component forces). The force acting in the vertical direction against the tapered surface 94A causes the lock member 90 to be pressed against the upper case section 14, while the force acting in the horizontal direction causes the lock member 90 to be pressed in a direction opposite to the biasing force of the coil spring 58, thereby allowing the lock member 90 to slide along the inner surface of the top plate 14A of the upper case section 14.

The thickness D (see FIG. 8) of the end portion 92A of the lock member 90 (the main body portion 92) disposed radially at the outer side (further at the outer side than the engagement portion 96) is set so as to be substantially the same as a distance W (see FIG. 2) between the upper surface of the upper flange 44 and the inner surface of the top plate 14A when the reel 40 is positioned at the lowermost position.

The engagement portion 96 having such a predetermined height-wise dimension as to engage with an upper edge portion of the reel hub 42 is provided protrudingly from the vicinity of the end portion 92A disposed radially at the outer side, in a direction perpendicular to the main body portion 92 (in the axial direction of the reel 40). The engagement portion 96 has the same width-wise dimension as that of the main body portion 92 and is formed such that the projecting height is lower than that of the cam portion 94. The lower end surface of the cam portion 94 disposed at the outer side in the radial direction is formed as the tapered surface 96A inclined at a predetermined angle. The outside surface of the engagement portion 96 including the tapered surface 96A is formed as an arc-shaped surface conforming to the inner peripheral surface of the reel hub 42 when seen from the top.

Accordingly, the lock member 90 temporarily locked by the stopper rib 74 is structured in such a manner that when the recording tape cartridge 10 is assembled (when the upper case section 14 is placed over the lower case section 16), the engagement portion 96 is readily engaged with the upper edge portion of the reel hub 42 accompanied by the above-described assembling operation. After the engagement, as shown in FIGS. 2 and 9, the end portion 92A of the main body portion 92 disposed radially at the outer side is separated from the stopper rib 74.

It is preferable that the draft angle of the mold for the inner peripheral surface of the reel hub 42 be zero degrees for permitting the outer surface of the engagement portion 96, except for the tapered surface 96A, to be disposed in contact with (pressed against) the inner peripheral surface of the reel hub 42. When the draft angle is larger than zero degree, the upper edge portion of the reel hub 42 tends to expand outwardly (the diameter of the upper edge portion becomes large) so that a pressing force by the engagement portion 96 is decreased, as a result of which the lock members 90 may no longer function appropriately.

With the above-described arrangement, when the recording tape cartridge 10 is in a nonuse state, the brake member 80 is downwardly biased due to a biasing force of the compression coil spring 78, while the lock members 90 are biased radially outwardly due to a biasing force of the coil spring 58, as shown in FIGS. 2 and 9. Consequently, the brake member 80 is prevented from rotating with respect to the case 12 because of the guide portions 84 being inserted between the guide wall portions 68, and the reel 40 is prevented from being inadvertently rotated because of the brake gear 82 of the brake member 80 being strongly meshed with the engagement gear 54 in the reel hub 42.

Due to the engagement portion 96 of the lock member 90 engaging with the upper edge portion of the reel hub 42, that is to say, due to the outer surface of the engagement portion 96, except for the tapered surface 96A, pressing against the inner peripheral surface of the reel hub 42 and the end portion 92A of the main body portion 92, which is further at the outer side in the radial direction than the engagement portion 96, being interposed between the upper surface of the upper flange 44 and the inner surface of the top plate 14A (with the thickness D of the end portion 92A being substantially equal to the distance W between the upper surface of the upper flange 44 and the inner surface of the top plate 14A), the reel 40 is prevented from moving upward at the time when the recording tape cartridge 10 is in a nonuse state.

When the recording tape cartridge 10 is in non-use, the engagement projection 86 and the cam portion 94 are disposed out of contact with each other so as to prevent the component force of the coil spring 58 from acting on the brake member 80. The clearance C2 between the opposing tapered surfaces 86A and 94A in the axial direction of the reel 40 (in the direction of movement of the brake member 80) is made smaller than an amount of meshing K between the brake gear 82 and the engagement gear 54 (in other words, than an ascending stroke of the brake member 80 until the meshing between the brake gear 82 and the engagement gear 54 is released).

This is because if the clearance C2 is larger than the amount of meshing K, the brake member 80 is readily moved upward by the amount of clearance C2 due to an impact such as dropping, with the result that the reel 40 is inadvertently caused to be rotatable. Accordingly, the clearance C2 between the engagement projection 86 and the cam portion 94 is extremely small, thereby making it impossible to cause the reel 40 and the brake member 80 to be substantially moved upward (in the axial direction of the reel 40) when the recording tape cartridge 10 is in a nonuse state.

Figure 13:
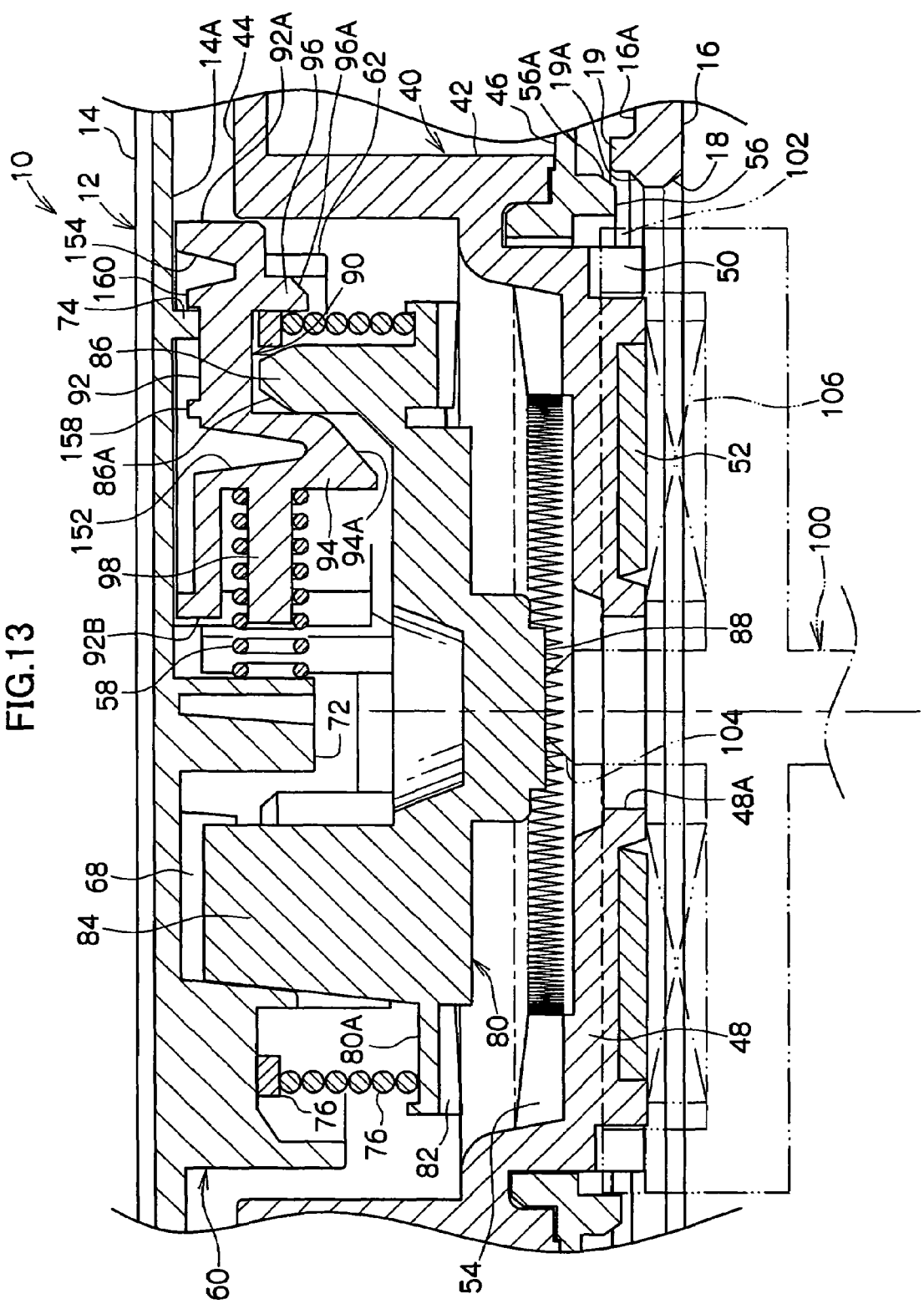
FIG. 13 is a partially enlarged, sectional side view which schematically shows the recording tape cartridge in the state after the rotary shaft moves upward.

When the recording tape cartridge 10 is used, as shown in FIGS. 3 and 13, the meshing between the brake gear 82 and the engagement gear 54 is released, and the tapered surface 86A of the engagement projection 86 of the brake member 80 contacts and presses against the tapered surface 94A of the cam portion 94 of the lock member 90, so that the lock member 90 is caused to slide radially inward against the biasing force of the coil spring 58.

As a result, the outer surface of the engagement portion 96 is moved away from the inner peripheral surface of the reel hub 42, and the outer end portion 92A of the main body portion 92 escapes from (moves away from) between the upper surface of the upper flange 44 and the inner surface of the top plate 14A. In the case 12, the reel 40 can move upward to a predetermined height and is made rotatable.

Incidentally, when the brake member 80 moves upward, the cam portion 94 is entered into the engagement projection 86. At this time, the outer surface of the cam portion 94 only comes in contact with the inner surface of the engagement projection 86, and the upper end surface of the engagement projection 86 does not come in contact with the lock member 90 and the lower end surface of the cam portion 94 also does not come in contact with the brake member 80. Further, the draft angles of the mold for the inner surface of the engagement projection 86 and the outer surface of the cam portion 94 are both set at zero degree. For this reason, the pressing force (biasing force) by the coil spring 58 against the lock member 90 is caught on the inner peripheral surface of the engagement projection 86, and no component force for pressing the brake member 80 downward occurs.

In other words, at the time of rotation of the reel 40, the pressing force (biasing force) by the coil spring 58 acts only in the radial direction of the reel 40, and does not act in the axial direction (the vertical direction) of the reel (which pressing force is not transmitted to the reel 40). Accordingly, the lock member 90 is maintained stably in an unlock state. The pressing force (biasing force) acting in the axial direction (vertical direction) of the reel 40 only serves as biasing force by the compression coil spring 78 as in the conventional manner. Therefore, even in the structure having the coil spring 58, addition of no excess load in the axial direction (in the downward direction) of the rotary shaft 100 can be avoided.

Preferably, as shown in FIGS. 7 and 8, the body portion 92 of each lock member 90 is formed with a recess 92C (alternatively, a convex) in the lower surface which contacts the stopper member 76. By forming such recesses 92C (alternatively, convexes), it is possible to decrease the contact area between the inner surface of the top plate 14A of the upper case section 14 and the stopper member 76 so that each lock member 90 is permitted to slide with a low resistance.

As illustrated in FIGS. 6 and 9, when the concave portion 150 is provided at the side of the rear surface of the lock member 90 (which surface comes into contact with the inner surface of the top plate 14A of the upper case section 14) so that only the outer edge of the rear surface of the lock member 90 serves as a sliding surface on the inner surface of the top plate 14A, as compared with a case in which the entire rear surface of the lock member 90 serves as the sliding surface, the contact area between the lock member 90 and the inner surface of the top plate 14A can be decreased, and the sliding resistance of the lock member 90 can be reduced.

Furthermore, in the top plate 14A, a stopper rib 74 for regulating movement of the lock member 90 is provided between the holding portions 70 disposed in the accommodation portion 63. The accommodation portion 63 is positioned further at the inner side than the reel hub 42 of the reel 40, and therefore, the stopper rib 74 is disposed inside the reel hub 42. Accordingly, even if the recording tape cartridge 10 drops and the reel 40 is released from a locked state, the stopper rib 74 does not come into contact with the reel 40, and there is no possibility that any concentrated stress caused by the stopper rib 74 acts on the reel 40.

Next, a description will be given of the operation of the recording tape cartridge 10 constructed as described above.

As illustrated in FIGS. 2 and 9, when the recording tape cartridge 10 is in a nonuse state (when it is not loaded into a drive device), the opening 20 is closed by the leader block 22. The reel 40 is biased downward by the compression coil spring 78 via the brake member 80. That is to say, due to the biasing force of the compression coil spring 78, the brake gear 82 of the brake member 80 strongly meshes with the engagement gear 54 in the reel hub 42, thereby preventing the reel 40 from being inadvertently rotated.

Further, each lock member 90 is biased by the biasing force of the coil spring 58 from the center (the axial center of the reel 40) of the mounting portion 60 in a radially outward direction, and thus the engagement portion 96 thereof is engaged with the upper edge portion of the reel hub 42. That is, the inner peripheral surface of the reel hub 42 is pressed by the outer surface, excluding the tapered surface 96A, of the engagement portion 96, and the end portion 92A, which is provided radially outside of the engagement portion 96, of the body portion 96 is interposed between the upper surface of the upper flange 44 and the inner surface of the top plate 14A.

The thickness D of the outer end portion 92A of the lock member 90 (the main body portion 92) is set so as to be substantially equal to the distance W between the upper surface of the upper flange 44 and the inner surface of the top plate 14A when the reel 40 is located at the lowermost position in the case 12. Therefore, the lock member 90 prevents upward movement of the reel 40. That is to say, the rotation of the reel 40 is inhibited and the movement of the reel 40 both in the radial direction and in the axial direction is regulated. Even if the recording tape cartridge 10 is subjected to an impact due to dropping or the like, there is no possibility that the reel 40 may moves upward.

Further, since the clearance C2 between the cam portion 94 of each lock member 90 and the engagement projection 86 of the brake member 80 is extremely small, or smaller than the amount of meshing K between the brake gear 82 and the engagement gear 54, the brake member 80 will not be substantially moved upward even if the recording tape cartridge 10 is impacted due to dropping or the like. Thus, there is no possibility that the brake gear 82 is disengaged from the engagement gear 54. Hence, no adverse influence is imparted to the recording tape T.

When recording data onto the recording tape of the recording tape cartridge 10 or reproducing data recorded on the recording tape of the recording tape cartridge 10, the recording tape cartridge 10 is loaded into a drive device (not shown). More specifically, the recording tape cartridge 10 is inserted along the direction indicated by arrow A, from the front wall 12A side into a loading slot (not shown) of the drive device.

When the recording tape cartridge 10 is loaded (inserted) into the drive device, the recording tape cartridge 10 moves downward by a predetermined amount, or the rotary shaft 100 moves upward, thereby causing the release projection 104 to be inserted from the through hole 48A. As shown in FIG. 10, the operation projection 88 is pushed up by the release projection 104, so that the meshing between the brake gear 82 of the brake member 80 and the engagement gear 54 of the reel hub 42 is released.

Figure 11:
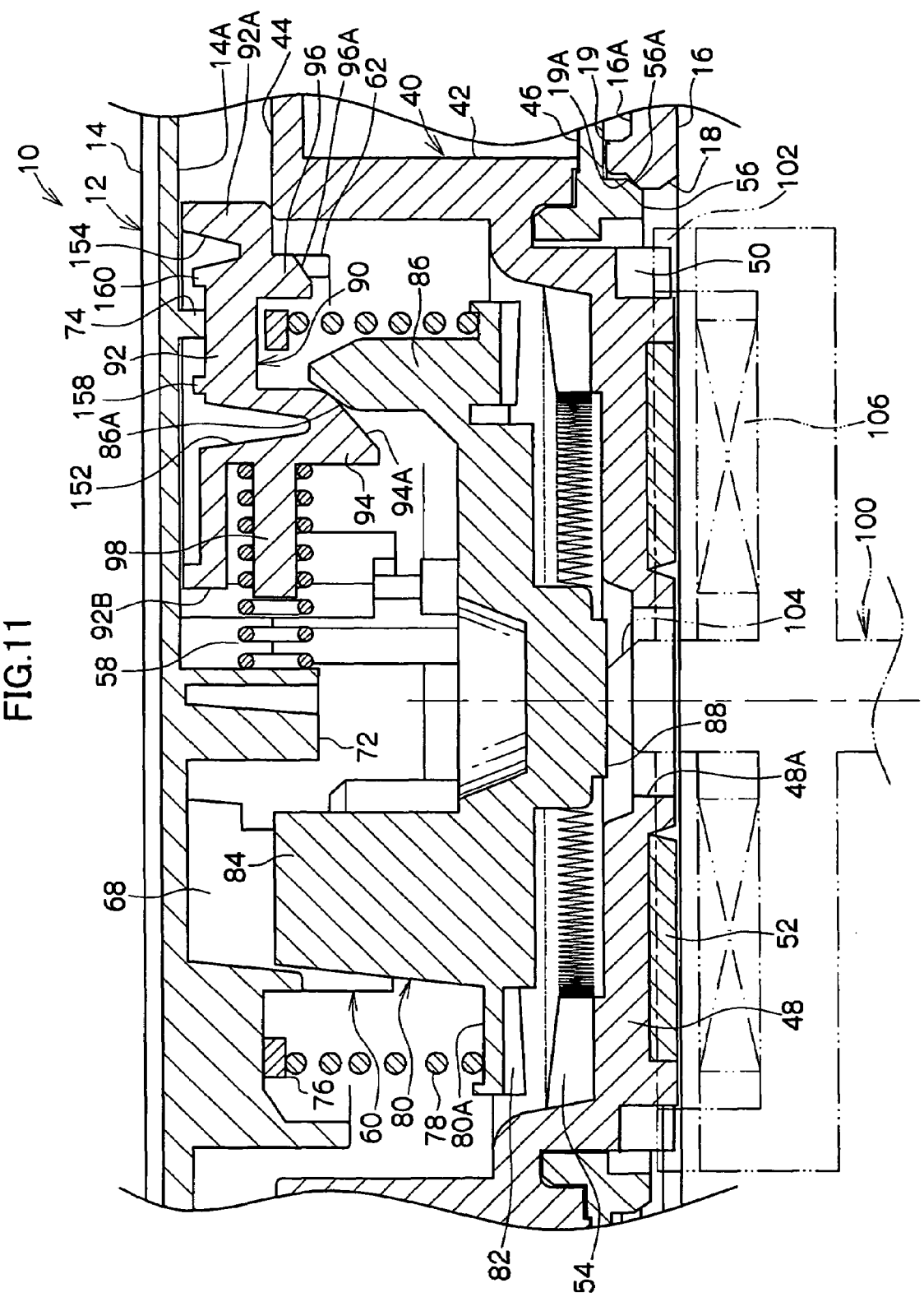
FIG. 11 is a partially enlarged, sectional side view which schematically shows the recording tape cartridge in the course of upward movement of the rotary shaft.
Figure 12:
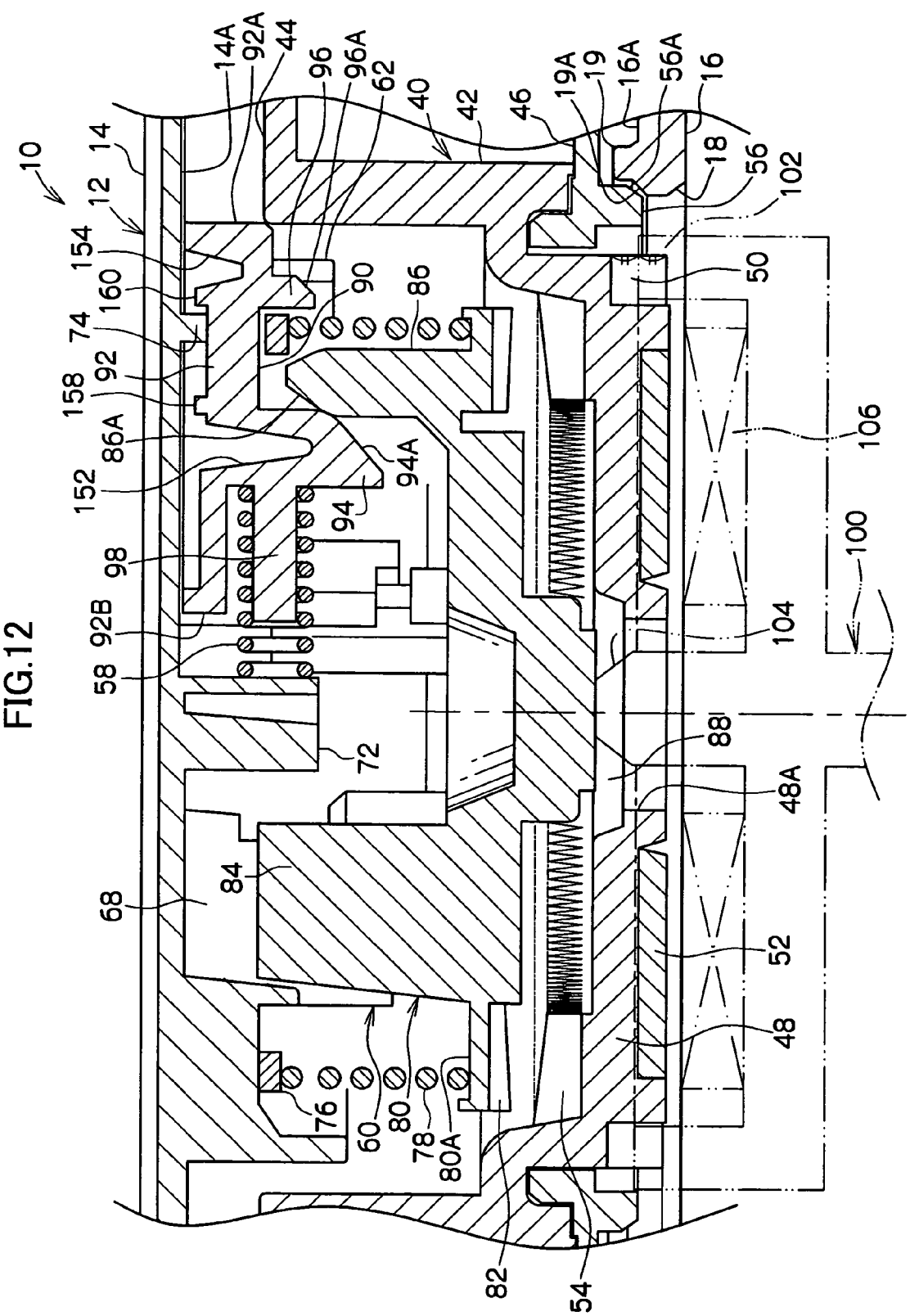
FIG. 12 is a partially enlarged, sectional side view which schematically shows the recording tape cartridge in the course of upward movement of the rotary shaft.

In addition, as shown in FIGS. 11 to 13, the release projection 104 of the rotary shaft 100 carries out positioning of the reel 40 in the height-wise direction via the operation projection 88, and the reel plate 52 is attracted to the magnet 106. As a result, the recording tape cartridge 10 (the reel 40) is positioned in the drive device with a high degree of accurately, and in this state, the drive gear 102 meshes with the reel gear 50.

Incidentally, as shown in FIG. 10, when the operation projection 88 is pressed upward by the release projection 104, the brake member 80 moves upward against the biasing force of the compression coil spring 78, and the engagement projection 86 abuts the cam portion 94 of the lock member 90 and presses the cam portion 94 in the upward direction.

As a result, the tapered surface 94A of the cam portion 94 is caused to slide on the tapered surface 86A of the engagement projection 86, and the lock member 90 begins to move to slide inward in the radial direction on the inner surface of the top plate 14A (in the accommodation portion 63) against the biasing force of the coil spring 58.

At this time, the recesses 92C are formed in the main body portion 92, and therefore, the lock member 90 is allowed to slide with a low resistance. Further, the lock member 90 is allowed to slide in a stable manner without being disengaged from the accommodation portion 63 (the mounting portion 60) by the stopper member 76 or the like.

In this way, when the lock member 90 begins to slide radially inward in the accommodation portion 63, the outer surface of the engagement portion 96 of the lock member 90 is separated from the inner peripheral surface of the reel hub 42 and the outer end portion 92A of the main body portion 92 begins to escape from between the upper surface of the upper flange 44 and the inner surface of the top plate 14A.

The meshing between the engagement gear 54 and the brake gear 82 is released and the drive gear 102 begins to mesh with the reel gear 50. As shown in FIG. 11, when the amount of meshing between the reel gear 50 and the drive gear 102 becomes substantially a half the gear height, the lock member 90 completely escapes from between the upper surface of the upper flange 44 and the inner surface of the top plate 14A.

That is to say, as shown in FIGS. 10 to 13, the lock member 90 is being interposed between the upper surface of the upper flange 44 and the inner surface of the top plate 14A until the amount of meshing between the reel gear 50 and the drive gear 102 becomes substantially a half the gear height, thereby making it impossible to move the reel 40 upward.

Accordingly, even when the recording tape cartridge 10 is loaded into a drive device which is placed in a vertical manner, there is no possibility that the reel 40 may be displaced vertically downward (the direction indicated by arrow C in FIGS. 2 and 3).

That is to say, due to the annular rib 56 formed upright on the lower surface of the reel 40 being supported by the annular rib 19 formed upright at the peripheral edge of the gear opening 18, the reel 40 is prevented from being displaced with respect to the case 12 (made misaligned from the axis line thereof).

When the amount of meshing between the reel gear 50 and the drive gear 102 becomes substantially a half the gear height, the lock member 90 completely escapes from between the upper surface of the upper flange 44 and inner surface of the top plate 14A, and the outer end portion 92A is disposed inside the reel hub 42, so as to allow the reel 40 to move upward. Thus, the reel 40 begins to move upward by the rotary shaft 100.

As a result, the annular rib 56 is moved away from the annular rib 19. At this time, the reel 40 (the reel gear 50) is supported by the drive gear 102 and the reel plate 52 is attracted to the magnet 106. Therefore, there is no possibility that the reel 40 be displaced vertically downward (in the direction indicated by arrow C).

Subsequently, when the drive gear 102 completely meshes with the reel gear 50 and the reel plate 52 is attracted to the magnet 106, the rotary shaft 100 moves upward to a predetermined position, and at the same time, the cam portion 94 is entered (moved down) inside the engagement projection 86 and the outer side surface of the cam portion 94 is disposed in contact with the inner surface of the engagement projection 86, so that the lock member 90 is held in an unlock state. Thus, the reel 40 can be driven to rotate at its predetermined height-wise position.

A pull-out member (not shown) of the drive device engages with the engagement portion 28 of the leader block 22 (see FIG. 1), and the leader block 22 is pulled out from the case 12. At this time, the recording tape cartridge 10 is positioned precisely within the drive device, and therefore, the pull-out member can reliably engage with the engagement portion 28 of the leader block 22. Thus, the leader block 22 pulled out from the recording tape cartridge 10 is accommodated in a fit-in portion formed in a hub (not shown) of a take-up reel disposed at the side of the drive device.

When the leader block 22 is accommodated in the fit-in portion of the take-up reel, the reel 40 and the take-up reel is driven to rotate by the rotary shaft 100 in a synchronous manner. As a result, the recording tape T is sequentially pulled out from the recording tape cartridge 10 while being wound onto the take-up reel, and a recording/reproducing head (not shown) disposed along a predetermined tape path allows data recording on the recording tape T or allows reproduction of data recorded on the recording tape T.

In a case in which the recording tape cartridge 10 is ejected from the drive device, the recording tape T is first wound back onto the reel 40, and the leader block 22 closes the opening 20 (see FIG. 1). Then, by causing the recording tape cartridge 10 to move upward or causing the rotary shaft 100 to move downward, as shown in FIG. 12, the reel 40 begins to move downward due to the biasing force of the compression coil spring 78 and the brake member 80 begins to move downward.

Accompanied by the aforementioned operation, the lock member 90 begins to move slidably by the biasing force of the coil spring 58 radially outward in the accommodation portion 63. In other words, the tapered surface 94A of the cam portion 94 begins to move slidably on the tapered surface 86A of the engagement projection 86.

When the rotary shaft 100 further moves downward, as shown in FIG. 11, the magnet 106 is moved away from the reel plate 52, and the meshing between the drive gear 102 and the reel gear 50 is gradually released. Thus, at the point in time when the amount of the meshing between the reel gear 50 and the drive gear 102 decreases substantially to a half the gear height, the outer end portion 92A of the lock member 90 (the main body portion 92) gradually moves so as to be interposed between the upper surface of the upper flange 44 and the inner surface of the top plate 14A.

In other words, before the state in which the drive gear 102 meshes with the reel gear 50 is completely released (during the time the reel 40 is supported by the rotary shaft 100), the look member 90 is interposed between the upper surface of the upper flange 44 and the inner surface of the top plate 14A, so as to hold the reel 40 between the lower case 16 and the lock member 90, with the result that the reel 40 is prevented from moving upward.

Accordingly, even when the recording tape cartridge 10 is ejected from the vertically placed drive device, the reel 40 is reliably locked by the lock member 90 without the reel 40 being displaced vertically downward (in the direction indicated by arrow C). In other words, the upper surface of the reel 40 is held by the lock member 90 so that the reel 40 is not allowed to move upward, and the annular rib 56 formed upright on the lower surface of the reel 40 is supported by the annular rib 19. Therefore, the reel 40 is prevented from being displaced with respect to the case 12 (deviated from the axis thereof).

Subsequently, when the rotary shaft 100 further moves downward, and as shown in FIG. 10, the when state in which the drive gear 102 meshes with the reel gear 50 is completely released, the engagement portion 96 engages with the upper edge portion of the reel hub 42. In other words, the biasing force of the coil spring 58 causes the outer surface of the engagement portion 96, except for the tapered surface 96A, to press against the inner peripheral surface of the reel hub 42.

As shown in FIG. 9, when the tapered surface 86A of the engagement projection 86 is moved away from the tapered surface 94A of the cam portion 94 and the release projection 104 is moved away from the operation projection 88, the biasing force of the compression coil spring 78 causes the brake member 80 to move downward to the lowermost position, so that the brake gear 82 strongly meshes with the engagement gear 54. As a result, the reel 40 is again brought into a state of being prevented from inadvertently rotating.

Thus, when the rotary shaft 100 is pulled out from the gear opening 18, the recording tape cartridge 10 is ejected from the loading gate.

As described above, in a case in which the recording tape cartridge 10 is loaded into the vertically placed drive device, the lock member 90 is structured such that the lock member 90 does not completely escape from between the upper surface of the upper flange 44 and the inner surface of the top plate 14A until the amount by which the drive gear 102 meshes with the reel gear 50 becomes substantially a half the gear height, in other words, the lock member 90 is structured such that the lock member 90 is placed to at an up-down movement permitting position that permits the reel 40 to move in the axial direction at the timing when the reel 40 begins to move upward by the meshing operation of the drive gear 102 with respect to the reel gear 50. Therefore, there is no possibility that the reel 40 may be displaced vertically downward (in the direction indicated by arrow C).

In other words, when the lock member 90 is located at the up-down movement permitting position, the reel 40 is allowed to move in the axial direction (the reel 40 is no longer supported), and could be displaced downward due to its own weight. At this time, however, the drive gear 102 is already in the state of meshing with the reel gear 50 to a certain degree, and therefore, the reel 40 (the reel gear 50) is supported by the rotary shaft 100 (the drive gear 102). Accordingly, there is no possibility that misalignment of axis (axis deviation) of the reel 40 with respect to the rotary shaft 100 may occur.

Further, even when the recording tape cartridge 10 is ejected from the vertically placed drive device, the lock member 90 is structured so as to be located at the up-down movement locking position that prevents the reel 40 from moving in the axial direction with the lock member 90 being interposed between the upper surface of the upper flange 44 and the inner surface of the top plate 14A, until the meshing of the drive gear 102 with respect to the reel gear 50 is released (before the meshing is completely released). Therefore, the lock member 90 can lock (support) the reel 40 suitably and reliably. Accordingly, even if the meshing of the drive gear 102 with respect to the reel gear 50 is released, there is no possibility that the reel 40 may be displaced vertically downward (in the direction indicated by arrow C).

Figure 14A:
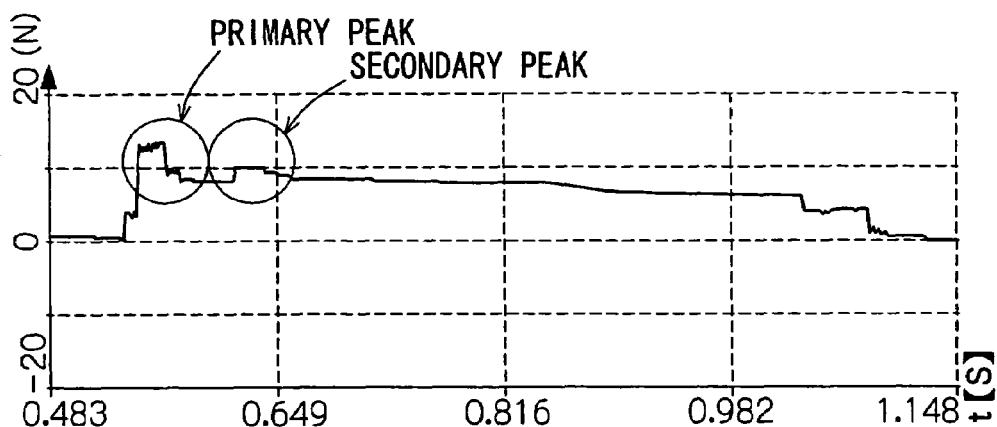
FIGS. 14A, 14B and 14C are graphs which each show data indicating brake releasing force, that is.

FIG. 14A shows the results of an acceleration endurance test (repeated 15,000-times brake releasing operation) in consideration of the actual operation, which is conducted between the lock member 90 and the brake member 80. The vertical axis represents pressing force (brake releasing force) required for lifting the brake member 80, and it can be seen that the brake releasing force of about 13N becomes necessary in the primary peak (described later). The brake releasing force of the drive device is usually less than 10N. When the brake releasing force of 13N is required, there are cases in which the brake might not be released by the drive device.

Figure 15:
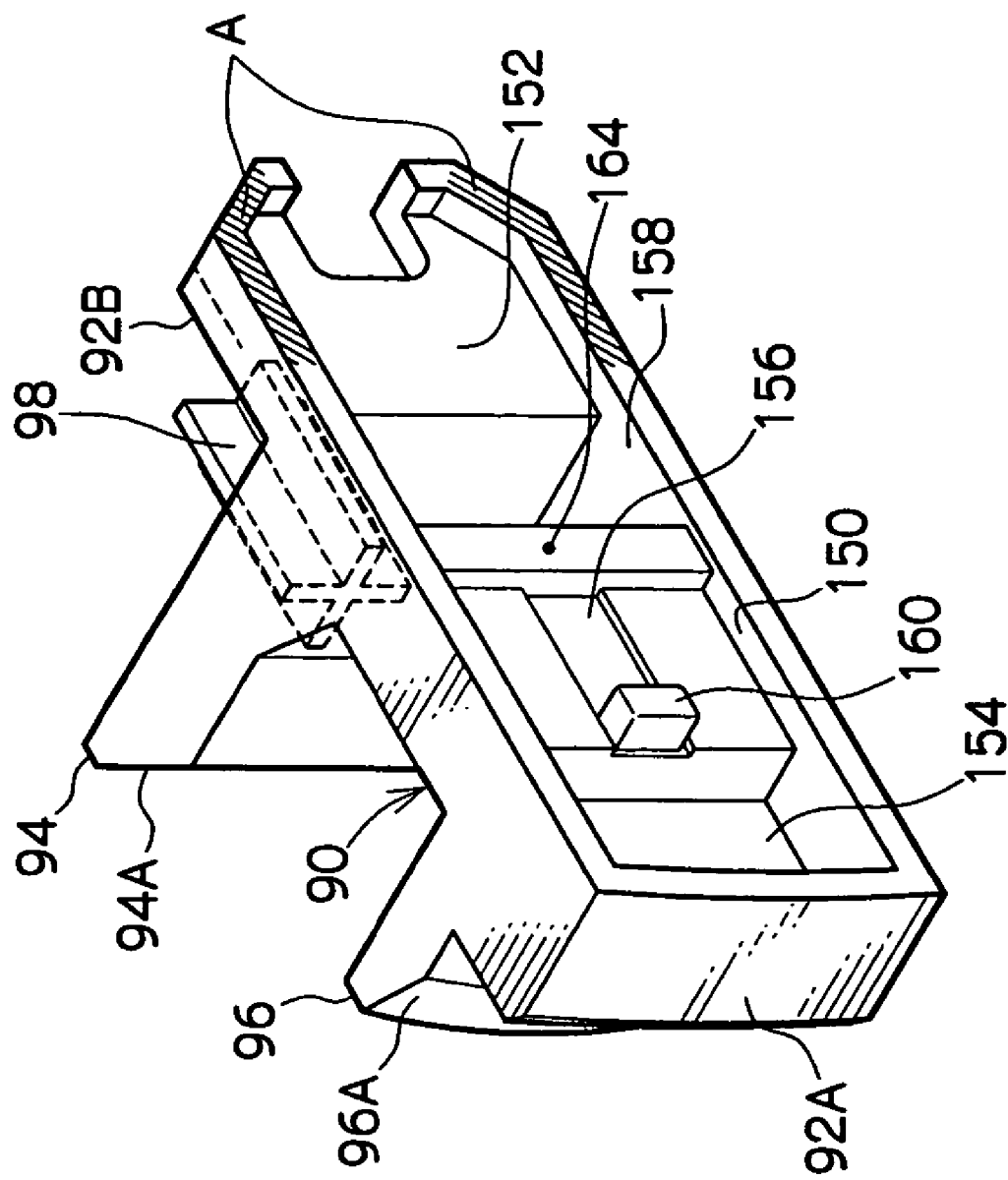
FIG. 15 is a perspective view showing a worn-out area of the lock member.
Figure 16:
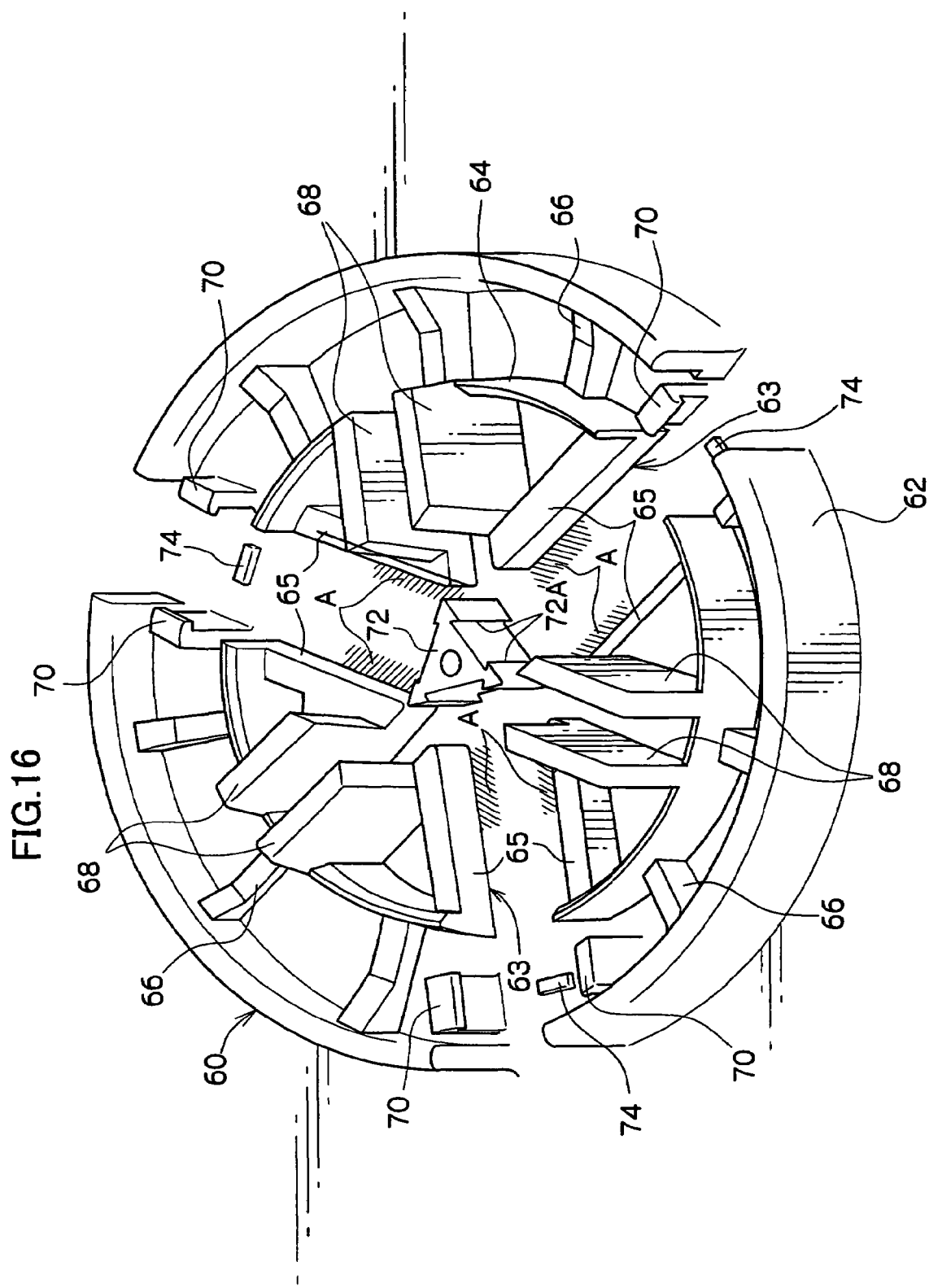
FIG. 16 is a perspective view showing a worn-out area on an internal surface of a top plate of the upper case section.
Figure 17:
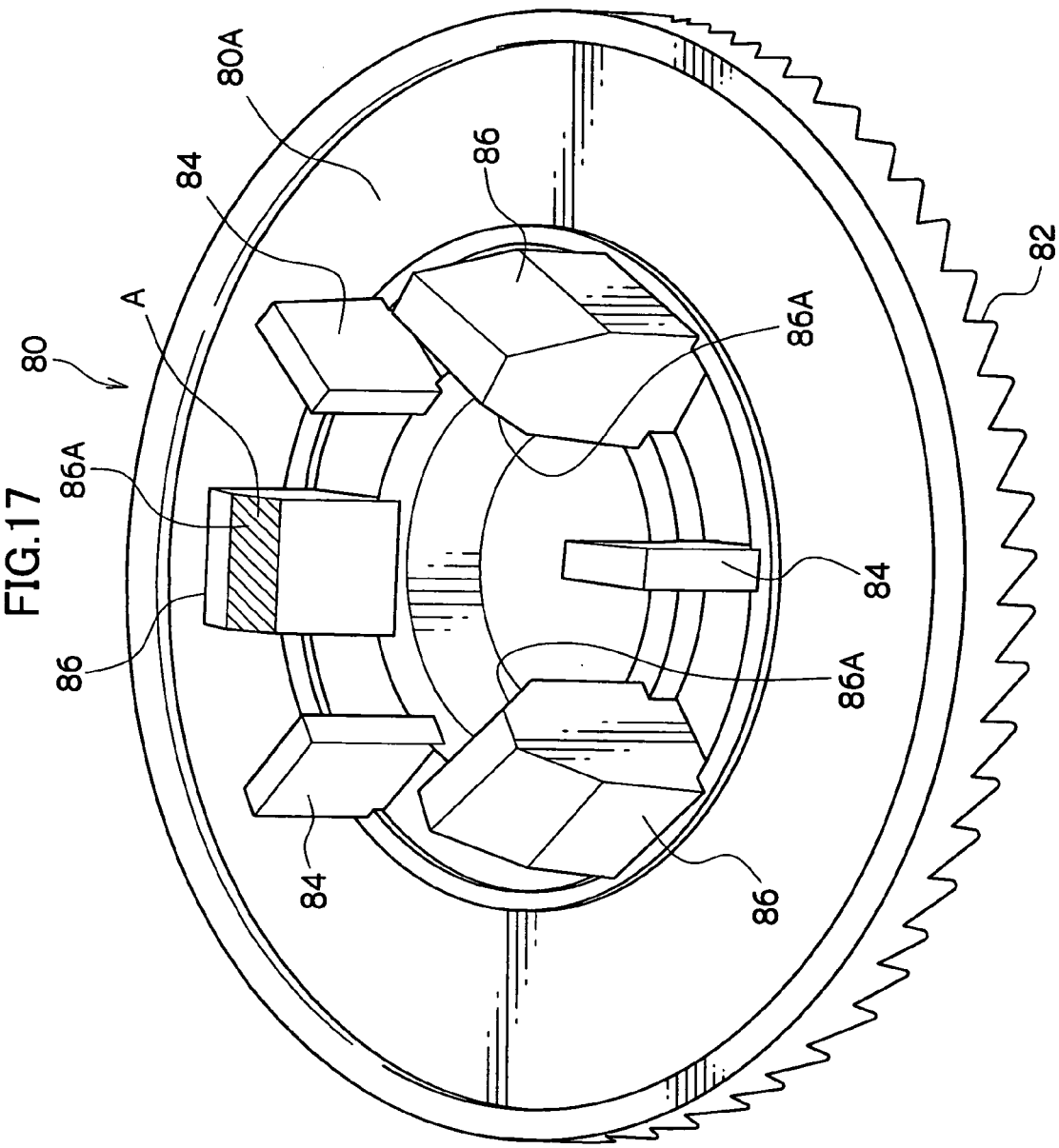
FIG. 17 is a perspective view showing a worn-out area of the brake member.
Figure 18:
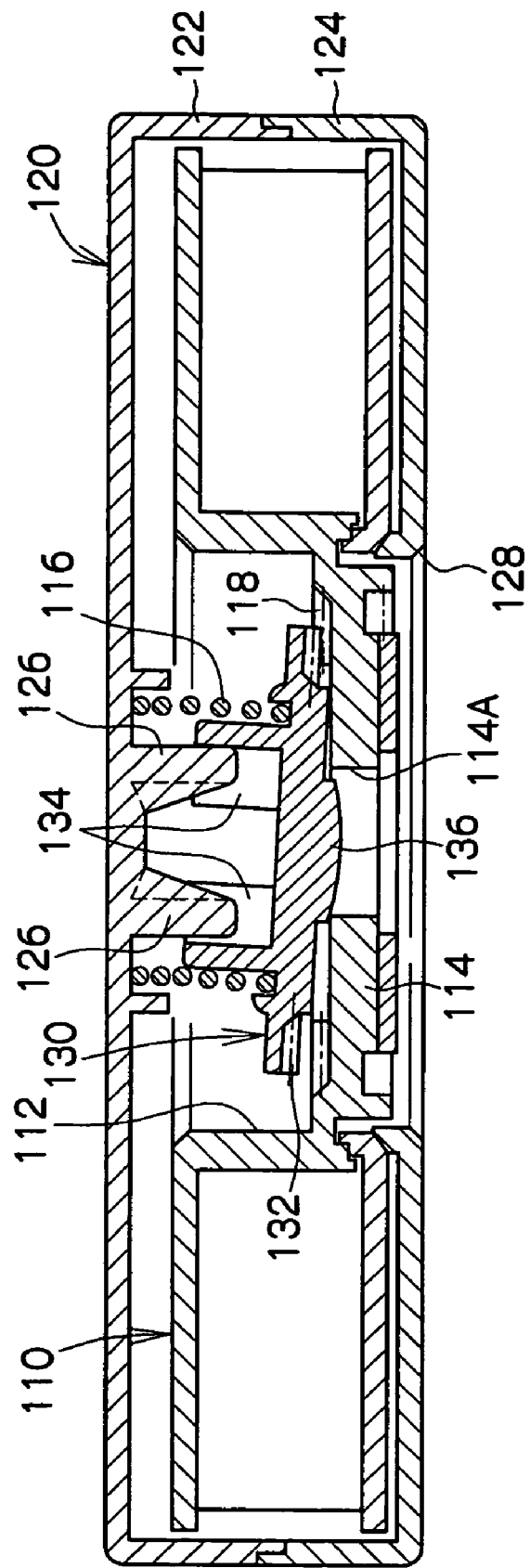
FIG. 18 is a partially enlarged, sectional side view which schematically shows a conventional recording tape cartridge.

On the sliding surfaces between the lock member 90 and the inner surface of the top plate 14A of the upper case 14, and on the sliding surfaces between the lock member 90 and the brake member 80, it is confirmed that areas A shown in FIGS. 15 to 17 are worn out. Particularly, the sliding surfaces between the lock member 90 and the inner surface of the top plate 14A are severely worn out and wear-out dust is generated.

This observational result reveals that the vertical direction load immediately after the brake member 80 and the lock member 90 come in contact with each other is the highest in a sample subjected to the 15,000-times sliding test. In other words, the frictional force caused between the lock member 90 and the inner surface of the top plate 14A and the frictional force caused between the lock member 90 and the brake member 80 after the test become highest at the point in time when the brake member 80 and the lock member 90 initially come into contact with each other (see FIG. 10), and therefore, the vertical load required for overcoming the foregoing also becomes high. Thus, it can be seen that the force for lifting the brake member 80 (the brake releasing force) becomes high.

Figure 14B:
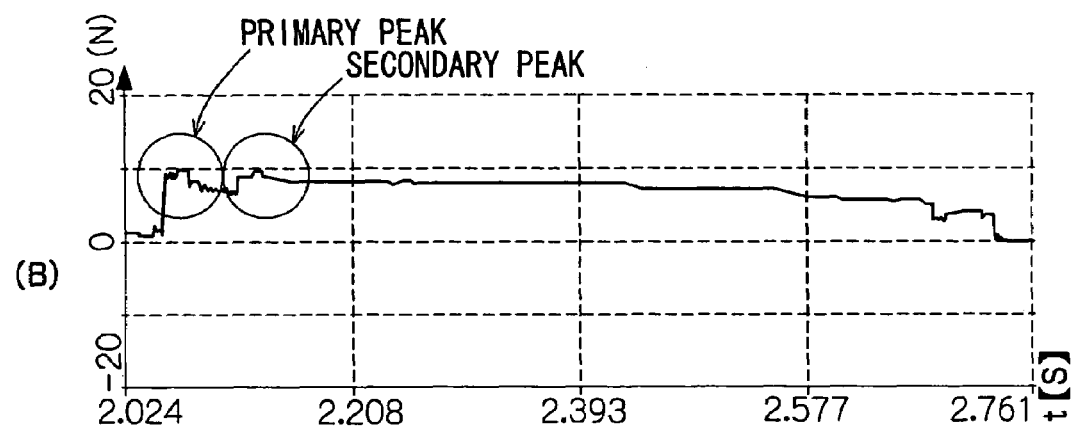
Figure 14C:
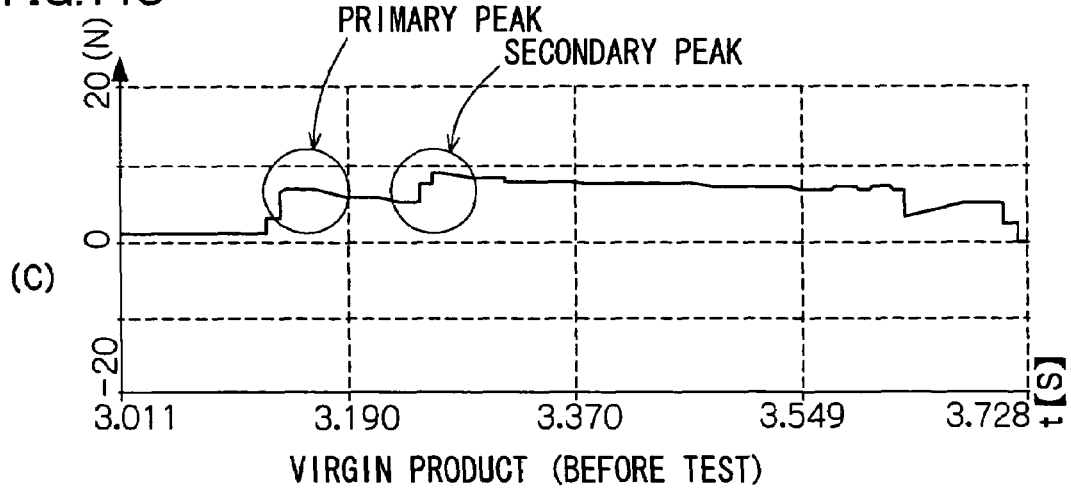

In the meantime, when a virgin product (a sample not subjected to the sliding test) is subjected to the above-described analysis, as shown in FIG. 14C (in FIGS. 14A to 14C, the horizontal axis represents time, but the pitch of each division of the horizontal axis is not standardized through these figures, and therefore, the respective wave forms in the horizontal axis do not coincide with one another), a peak is definitely marked even when the brake member 80 and the lock member 90 come into contact with each other, but it can be seen that the peak at the point in time when the tapered surface 86A of the brake member 80 completely passes on the tapered surface 94A (see FIG. 12) is higher than the former peak (in this case, two stage peak times are shown). The point in time when the brake member 80 and the lock member 90 initially come into contact with each other will be hereinafter referred to as a primary peak, while the point in time when the brake member 80 passes on the tapered surface 94A will be hereinafter referred to as a secondary peak.

Further, when wear-out dust generated on the sliding surfaces between the lock member 90 and the inner surface of the top plate 14A is removed in the sample subjected to the 15,000-times sliding test, the peak of the brake releasing force shows a value considerably close to that of the virgin product. Here, according to observation of the actual product, it can be seen that a portion of the lock member 90 which portion is near the center of the upper case section 14 is severely scraped. Further, it is seen that the above-described phenomenon also depends on temperature or humidity.

Consequentially, the test is further carried out based on the hypotheses as mentioned below.
1. Since static friction force is larger than dynamic friction force, a portion of the lock member 90 which portion is located near the center of the upper case section 14 is severely scraped.
2. The scraping phenomenon induces the wear-out on the sliding surfaces between the lock member 90 and the inner surface of the top plate 14A, and on the sliding surfaces between the lock member 90 and the brake member 80. In other words, as the frictional force becomes higher, the vertical force (the brake releasing force) also becomes larger. The sliding surfaces are made to slide at a high pressure, and therefore, they are liable to be scraped. This results in a vicious circle of increasing the μ value that shows a coefficient of friction;
3. When the wear-out conditions of the lock member 90 and the inner surface of the top plate 14A of the upper case section 14 are compared with each other, the portion located near the center of the inner surface of the top plate 14A is more severely worn out. In other words, the lock member 90 is slightly tilted by the brake member 80, and therefore, the lock member 90 is brought into a one-sided contact state; and
4. The wear-out condition varies according to circumstances and the brake releasing force also varies.

Based on the above-described hypotheses, the following confirmation results are obtained.
1. As shown in FIG. 14A, after the primary peak, the brake releasing force once goes down. Therefore, it is clear that the static friction force is larger than the dynamic friction force.
2. It is clear from the relation of component forces that a high friction force leads to a high vertical force. Further, it is readily assumed that when the face pressure (pressing force of the brake member 80 against the lock member 90) is high, a sliding portion (in the lock member 90) is liable to be scraped. Since the peak of the brake releasing force shows a value approximately close to that of the virgin product only by removing wear-out dust on the sliding surfaces between the lock member 90 and the inner surface of the top plate 14A in the sample having an increased primary peak, it can be seen that the sliding resistance of the sliding surfaces between the lock member 90 and the inner surface of the top plate 14A has a great effect on the brake releasing force.
3. A hole is formed in the peripheral wall 14B of the case 14, and a high-speed camera and a light are set to be near thereto. As a result, the lock member 90 is tilted and released as expected, and an explanation of the cause that the lock member 90 is brought into a one-sided contact state substantially can be made.
4. It can be seen that the lock member 90 or the inner surface of the top plate 14A are worn out most severely in the environment of 10° C. and 10%, and the wear-out becomes severe in the environment of low temperature and low humidity. PC (polycarbonate) is used as the material to form the case 14, and PA (polyamide) is used as the material to form the lock member 90.

It can be seen experimentally that the above-described vicious circle may not occur unless the phenomenon that the lock member 90 or the inner surface of the top plate 14A is scraped is caused. Accordingly, the way of preventing the lock member 90 from being brought into a one-sided contact state and reducing the vertical force imparted to the lock member 90 are thought and discussed.

In the present embodiment, as shown in FIG. 10, in the state in which the tapered surface 86A of the brake member 80 abuts the tapered surface 94A of the lock member 90, the pressing force from the brake member 80 acts on the lock member 90. The shape of the lock member 90 is set so that the center of gravity G of the lock member 90 is provided along the direction of the pressing force acting.

As a result, when the brake member 80 initially comes into contact with the lock member 90 (at the time when the brake member 80 begins to come in contact with the lock member 90) (the center of gravity of the lock member 90 is provided on a line extending, from a point at which the brake member 80 initially comes into contact with the lock member 90, in a direction in which the brake member 80 presses the lock member 90), an angular moment is not to act on the lock member 90. Particularly, since the static friction force is larger than the dynamic friction force, at the time when the brake member 80 begins to come into contact with the lock member 90, the pressing force of the brake member 80 imparted to the lock member 90 becomes the maximum.

For this reason, by preventing the sliding surface of the lock member 90 from being brought into a one-sided contact state by that the angular moment does not act on the lock member 90 at the time when the brake member 80 begins to come into contact with the lock member 90, it is possible to prevent the sliding portion of the lock member from being worn out and thereby prevent an increase of the brake releasing force. By this, the experimental results show that a decrease of about 7% at the primary peak of the brake releasing force is achieved in the case of the virgin product, and a decrease of about 20% is achieved in the case of the 15,000-times test product, thereby resulting in the brake releasing force of less than 10N. Further, it is found that the wear-out of the sliding surfaces of the inner surface of the top plate 14A and the lock member 90 are also alleviated.

In order that the vertical-direction force imparted by the brake member 80 be converted to the horizontal-direction force, the tapered surface 94A is formed on the abutting surface of the lock member 90 which surface abuts the brake member 80. By the tapered surface 94A being inclined so as to be vertical as far as possible, the vertical force imparted to the lock member 90 can be reduced.

However, the stroke of the brake member 80 and the amount of the lock member 90 moving are both restricted, and the tilt angle of the tapered surface 94A is determined by the restriction. Accordingly, the inclined surface of the lock member 90 with which the brake member 80 abuts is set in the range of about 45 to 60 degrees. In the present embodiment, the tapered surface 94A is inclined with respect to the horizontal direction (with respect to the direction orthogonal to the axis line of the reel hub 42) at about 56 degrees. As a result, the primary peak in the virgin product is decreased by about 10%, and the primary peak in the 15,000-times test product is decreased by about 25%.

Incidentally, in this case, the inner peripheral surface of the reel hub 42 is pressed by the outer surface of the lock member 90, except for the tapered surface 96A of the engagement portion 96, and the end portion 92A of the main body portion 92 which end portion is radially outside of the engagement portion 96 is interposed between the upper surface of the upper flange 44 and the inner surface of the top plate 14A, so as to prevent rotation of the reel 40 and also regulate (control) movement of the reel 40 both in the radial direction and in the axial direction. However, it suffices that only the axial movement of the reel 40 can be regulated. Therefore, the inner surface of the reel hub 42 does not necessarily need to be pressed by the outer surface of the lock member 90 except for the tapered surface 96A of the engagement portion 96.

That is to say, the present embodiment is merely one example, and it is a matter of course that any modification may be appropriately made without departing from the scope of the present invention.

Further, as shown in FIGS. 2 and 3, at least one lock member 90 is preferably provided at an upper side of the vertical direction (the vertically downward direction is indicated by arrow C) when the recording tape cartridge 10 is loaded into the vertically placed drive device (when the recording tape cartridge 10 is loaded in a vertical manner). With this structure, it is possible to suitably prevent the reel 40 from being displaced (misaligned with respect to the axis of the rotary shaft 100) vertically downward (in the direction indicated by arrow C) due to its own weight.

Moreover, it suffices that the lock member 90 is structured such that it completely escapes from between the upper surface of the upper flange 44 and the inner surface of the top plate 14A at the same time when the reel gear 50 and the drive gear 102 mesh with each other by an amount that is substantially a half the gear height, or after the meshing. Accordingly, the lock member 90 may also be structured so that a tapered surface (not shown) that is tapered outward at a predetermined angle is formed from a predetermined position on the lower surface of the outer end portion 92A of the lock member 90, thereby the lock member 90 can be made to escape while allowing the upward movement of the reel 40.

In the above-described embodiment, as the biasing member that biases the lock member 90 from the center of the reel 40 (the mounting portion 60) outward in the radial direction, the coil spring 58 is used as an example. However, the biasing member is not limited to the same, and may be constituted by a plate spring, a torsion spring or the like. Further, with the structure in which the biasing member described above is disposed substantially at the center of the inner surface of the top plate 14A (at the center of the mounting portion 60), preferably, a dead space within the case 12 can be effectively utilized and the biasing member can be made smaller.

Further, although in the above-mentioned embodiment, it is arranged that the lock member 90 is caused to slide radially due to engagement with the brake member 80, the arrangement for causing the lock member 90 to slide radially is not limited thereto. It is also possible that in addition to the brake member 80, a switching member or the like may be provided which is adapted to switch the lock member 90 between an up-down movement locking position (a position for preventing the reel 40 from being axially moved) and an up-down movement permitting position (a position for permitting the reel 40 to be axially moved), for example. However, in this case, it is preferable that the switching member or the like be arranged such that it is operated in interlocking relationship with the brake member 80.

What is claimed is:

1. A recording tape cartridge comprising:
   an engagement portion which is formed on a bottom wall of a hub of a reel which is rotatably accommodated in a case and on which a recording tape is wound;
   a brake member facing the engagement portion and provided so as to be movable along an axial direction of the hub, the brake member engaging with the engagement portion to regulate rotation of the reel and releasing the state of engagement with the engagement portion to allow rotation of the reel;
   a component mounting portion which is formed at the central portion of the case and positioned further at the inner side of the hub in a radial direction of the reel;
   a lock member, mounted at the component mounting portion so as to be movable in the radial direction of the reel and provided between the reel and the case to regulate at least movement of the reel in the axial direction, which moves away from the reel by being pressed by the brake member to thereby allow movement of the reel, the lock member having a center of gravity thereof provided along a direction in which the brake member initially comes into contact with and presses the lock member; and
   a biasing member which biases the lock member in the radial direction of the reel.

2. The recording tape cartridge according to claim 1, wherein the lock member comprises an inclined surface with which the brake member comes into contact, the inclined surface being inclined in the range of about 45 to 60 degrees with respect to a direction orthogonal to the axial direction of the reel.

3. The recording tape cartridge according to claim 1, wherein the center of gravity of the lock member is provided on a line extending, from a point at which the brake member initially comes into contact with the lock member, in a direction in which the brake member presses the lock member.

4. A recording tape cartridge comprising:
   an engagement portion which is formed on a bottom wall of a hub of a reel which is rotatably accommodated in a case and on which a recording tape is wound;
   a brake member facing the engagement portion and provided so as to be movable along an axial direction of the hub, the brake member engaging with the engagement portion to regulate rotation of the reel and releasing the state of engagement with the engagement portion to allow rotation of the reel;
   a component mounting portion which is formed at the central portion of the case and positioned further at the inner side of the hub in a radial direction of the reel;
   a lock member, mounted at the component mounting portion so as to be movable in the radial direction of the reel and provided between the reel and the case to regulate at least movement of the reel in the axial direction, which moves away from the reel by being pressed by the brake member to thereby allow movement of the reel, the lock member having an inclined surface with which the brake member comes into contact, the inclined surface being inclined in the range of about 45 to 60 degrees with respect to a direction orthogonal to the axial direction of the reel, and an inclined angle, with respect to the direction orthogonal to the axial direction of the reel, of an inclined surface of the brake member with which the inclined surface of the lock member comes into contact being larger than the inclined angle of the inclined surface of the lock member; and a biasing member which biases the lock member in the radial direction of the reel.

5. The recording tape cartridge according to claim 4, wherein the lock member includes a center of gravity thereof provided along a direction in which the brake member initially comes into contact with and presses the lock member.

* * * * *